(12) United States Patent
Koyata et al.

(10) Patent No.: US 7,827,112 B2
(45) Date of Patent: Nov. 2, 2010

(54) DIGITAL SIGNAL PROCESSING APPARATUS, DIGITAL SIGNAL PROCESSING METHOD, INFORMATION CENTER, AND DATA DELIVERY SYSTEM

(75) Inventors: Tomohiro Koyata, Tokyo (JP); Taro Konno, Kanagawa (JP)

(73) Assignee: Sony Corporation (JP)

( * ) Notice: Subject to any disclaimer, the term of this patent is extended or adjusted under 35 U.S.C. 154(b) by 1077 days.

(21) Appl. No.: 10/085,462

(22) Filed: Feb. 28, 2002

(65) Prior Publication Data

US 2002/0161715 A1 Oct. 31, 2002

(30) Foreign Application Priority Data

Mar. 1, 2001 (JP) .............................. P2001-056469

(51) Int. Cl.
G06F 21/00 (2006.01)
(52) U.S. Cl. .......................................... 705/58; 705/57
(58) Field of Classification Search .................. 705/59;
340/5.1
See application file for complete search history.

(56) References Cited

U.S. PATENT DOCUMENTS

| | | | | |
|---|---|---|---|---|
| 5,345,316 A * | 9/1994 | Ozaki et al. | ................. | 382/234 |
| 5,513,169 A * | 4/1996 | Fite et al. | ..................... | 720/718 |
| 5,530,750 A * | 6/1996 | Akagiri | ...................... | 704/500 |
| 5,548,574 A * | 8/1996 | Shimoyoshi et al. | ... | 369/124.09 |
| 5,561,608 A * | 10/1996 | Shimoda et al. | ............. | 345/645 |
| 5,592,511 A * | 1/1997 | Schoen et al. | ................ | 375/220 |
| 5,835,102 A * | 11/1998 | Monroe et al. | ............... | 345/545 |
| 5,841,512 A * | 11/1998 | Goodhill | ....................... | 352/56 |
| 5,870,467 A * | 2/1999 | Imai et al. | ...................... | 705/57 |
| 5,893,910 A * | 4/1999 | Martineau et al. | .............. | 707/10 |
| 5,982,891 A * | 11/1999 | Ginter et al. | ................... | 705/54 |
| 6,028,936 A * | 2/2000 | Hillis | .......................... | 713/168 |
| 6,040,843 A * | 3/2000 | Monroe et al. | ............... | 345/530 |
| 6,073,123 A * | 6/2000 | Staley | .......................... | 705/58 |
| 6,076,063 A * | 6/2000 | Unno et al. | .................. | 704/500 |
| 6,161,179 A * | 12/2000 | Seidel | ......................... | 713/168 |
| 6,253,193 B1 * | 6/2001 | Ginter et al. | ................... | 705/57 |
| 6,333,940 B1 * | 12/2001 | Baydar et al. | ................ | 370/506 |
| 6,463,539 B1 * | 10/2002 | Mochizuki | .................... | 713/193 |
| 6,499,106 B1 * | 12/2002 | Yaegashi et al. | ............. | 713/193 |
| 6,711,624 B1 * | 3/2004 | Narurkar et al. | ............. | 719/321 |
| 6,814,282 B2 * | 11/2004 | Seifert et al. | ................. | 235/379 |
| 7,046,607 B2 * | 5/2006 | Yamada | ..................... | 369/53.21 |
| 7,209,565 B2 * | 4/2007 | Lokhoff et al. | ................. | 381/22 |
| 7,315,829 B1 * | 1/2008 | Tagawa et al. | ................. | 705/26 |
| 7,362,946 B1 | 4/2008 | Kowald | | |
| 7,562,300 B1 * | 7/2009 | Tobias et al. | ................. | 715/727 |
| 2001/0017828 A1 * | 8/2001 | Yamada | ..................... | 369/47.12 |
| 2004/0133793 A1 * | 7/2004 | Ginter et al. | ................. | 713/193 |
| 2005/0240756 A1 * | 10/2005 | Mayer | ............................ | 713/2 |

* cited by examiner

*Primary Examiner*—Evens J Augustin
*Assistant Examiner*—Nancy T Le
(74) *Attorney, Agent, or Firm*—Lerner, David, Littenberg, Krumholz & Mentlik, LLP

(57) ABSTRACT

A digital signal processing apparatus, a digital signal processing method, an information center, and a data delivery system are capable of judging reliably whether digital signals such as music data signals recorded on a storage medium have been legally purchased by a customer from a legitimate vendor, so that only when the digital signals are judged to be legitimately purchased data, will a new service be offered to the customer.

15 Claims, 14 Drawing Sheets

FIG.2

| CONTENT NO. | MAIN INFORMATION | TEXT INFORMATION | IMAGE INFORMATION | OTHER INFORMATION | DETECTED FRAME NO. |
|---|---|---|---|---|---|
| 1 | SongA.dat | SongA.txt | SongA.jpg | ............ | 5 |
| 2 | SongB.dat | SongB.txt | SongB.jpg | | 82 |
| 3 | SongC.dat | SongC.txt | SongC.jpg | | 46 |
| ...... | ...... | ...... | ...... | | ...... |

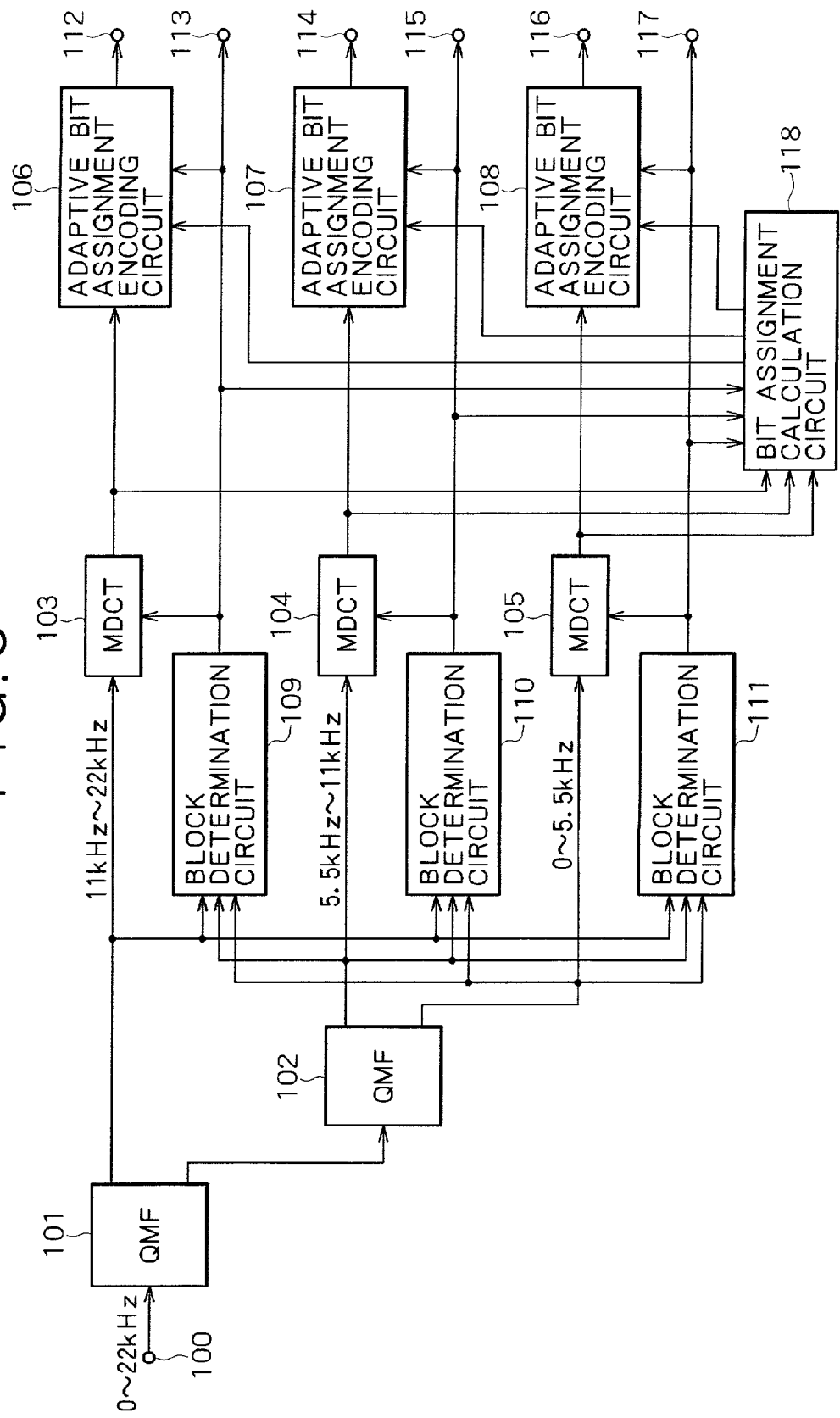

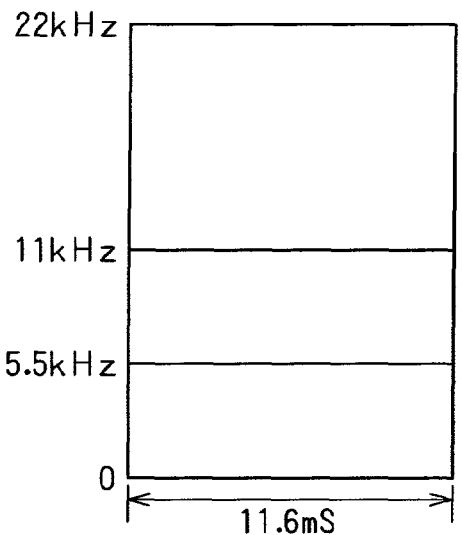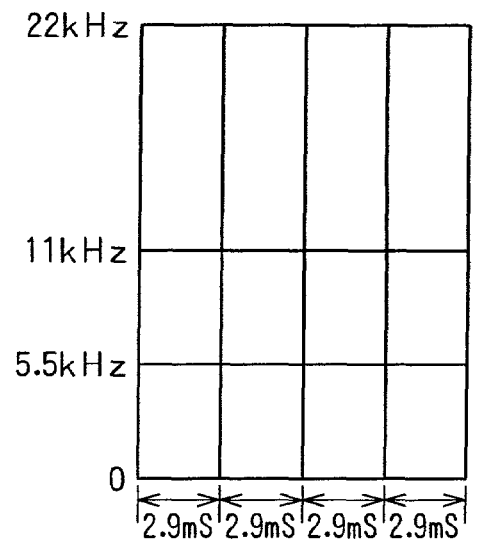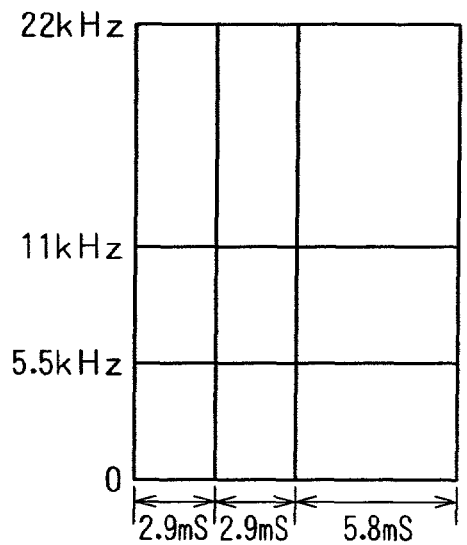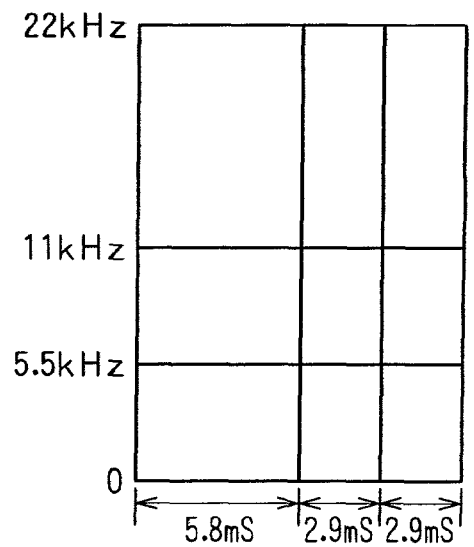

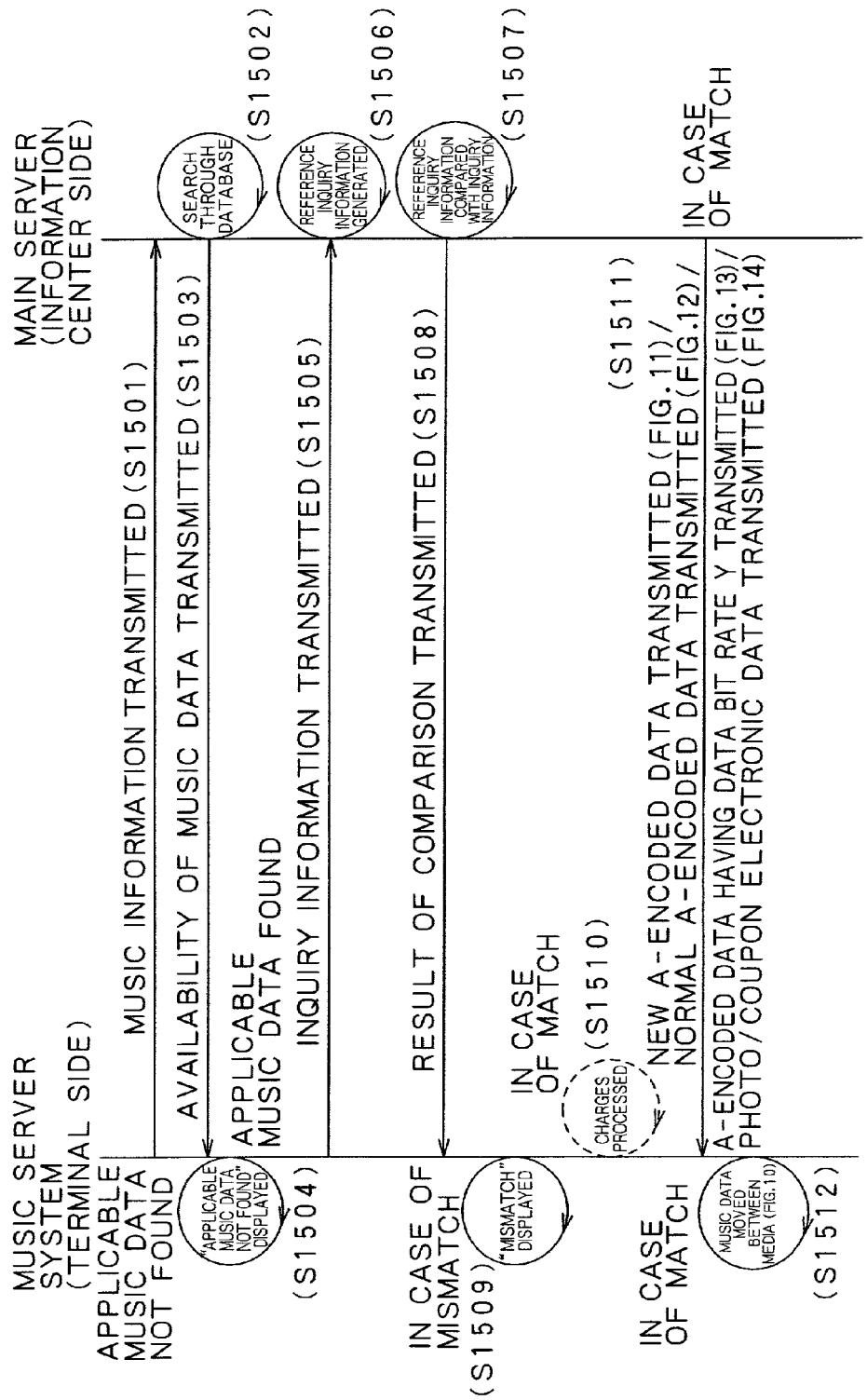

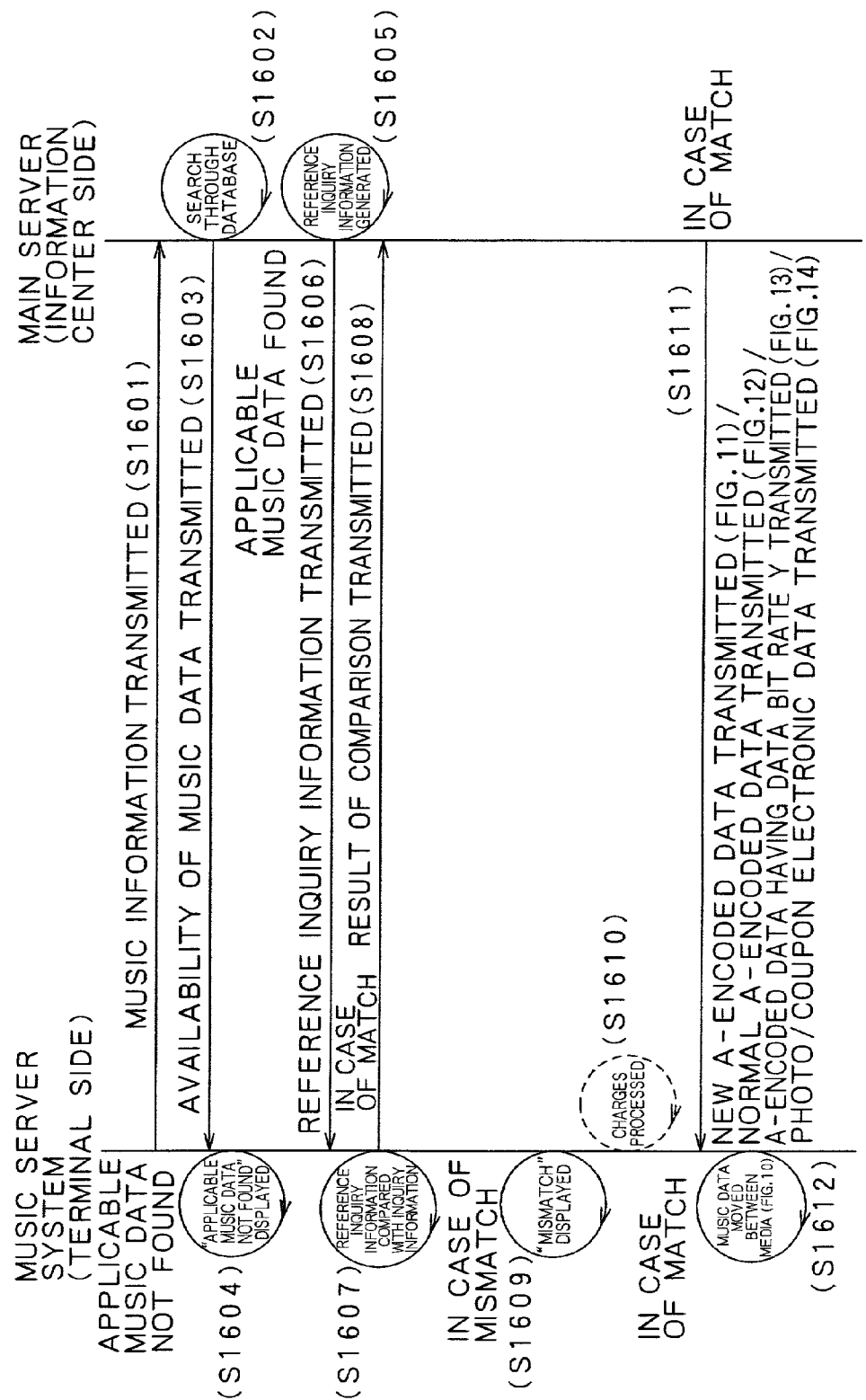

DIGITAL SIGNAL PROCESSING APPARATUS, DIGITAL SIGNAL PROCESSING METHOD, INFORMATION CENTER, AND DATA DELIVERY SYSTEM

BACKGROUND OF THE INVENTION

The present invention relates to a digital signal processing apparatus, a digital signal processing method, an information center, and a data delivery system for processing signals such as digital audio data.

Customers can acquire audio data including music data in a number of ways. One way is to purchase such storage media as records or compact discs (CD) carrying desired data. Another way is to tune in to radio broadcasts or like transmissions to get desired audio data recorded onto a recordable storage medium.

Recent years have witnessed the launching of a so-called server system scheme selling music data. Under this scheme, large amounts of audio data (music data) are stored on hard disks or like means from which customers may purchase desired music data for transfer to external storage media in their possession.

Under the server system scheme, server systems are set up illustratively at storefronts. A customer with his or her own storage medium (external storage medium) walks up to one of such server systems at a storefront. After paying a required amount, the customer gets desired music data recorded onto the storage medium.

Generally, the music data are held in compressed format in the server system to make the most of the server's storage and data transfer capacities. That means the server system is capable of having requested music data transferred and recorded to the customer's storage medium in a shorter time period than the actual playing time of the music data in question.

When purchasing music data, the customer makes such entries into the server system as the title of desired music data, name of a performer(s), playing time, or other additional information in text format or through an image-driven selection interface. The server system verifies the entries to let the customer retrieve the desired music data easily for recording to his storage medium for enjoyment.

The above type of server system may accommodate a plurality of types of external storage media. Such media may include a small magneto-optical disc known as the MD (Mini-disc) and a semiconductor device called the memory card.

There may be a case in which a user wants to move previously purchased music data from an MD to another storage medium such as a memory card, illustratively because the user's MD player has ceased to be functional. In that case, the user may not be able to copy the data from one of his own storage media to another because of copyright considerations or due to the degradation of sound quality following duplication.

If that happens, the user must purchase again the music data of interest through the server system for recording to the new storage medium. This is disadvantageous to the user who has to buy the same music data just because his old storage medium carrying the previously recorded music data is no longer usable.

There may be a case where the user wants to purchase, using the same storage medium, the same music data in a compressed format offering a better sound quality than in the old compressed format in effect at the time of the preceding purchase. This is also disadvantageous to the user who is required to pay again for the same music data, with the previously purchased music data of lesser sound quality not in use.

There may also be a case in which the user, having used a defective storage medium upon the preceding purchase, wants to have the same music data rerecorded onto the storage medium. In this case, the user must also pay more than once for the same music data from the server system despite the previous legitimate purchase.

One solution to the problems above might involve arranging for each storage medium to retain information for identifying the source (i.e., vendor) from which music data were purchased. The arrangement would allow the user wishing to buy the same music data to do so from the same source free of charge or at a reduced price.

Currently marketed storage media, however, have no storage area for accommodating the information representative of the music data source (vendor). If the source identification information were added from now on to the music data to be purchased and recorded to users' storage media, the users who already possess previously purchased music data on their storage media are also at a disadvantage. That is because the absence of such identification information in the music data in the possession of these users disqualifies them from any new services that may be offered to newcomers.

There is thus a growing need for a music data server system capable of judging easily and unfailingly whether music data found on a given user's storage medium have been legally purchased from a legitimate vendor, so that new services can be offered to legitimate users if they make further purchases from the same vendor.

The criteria for judging whether given data are a legal purchase from a legitimate vendor are fairly straightforward. Illustratively, if a user's data turn out to be a copy of music data purchased by someone else from the server system, or are a duplicate of data from package media such as CDs in the possession of others, the copied data are obviously illegal.

SUMMARY OF THE INVENTION

The present invention has been made in view of the above circumstances and provides a digital signal processing apparatus, a digital signal processing method, an information center, and a data delivery system for judging reliably whether music data found on a given user's storage medium have been legally purchased from a legitimate vendor, so that new services may be offered to legitimate users only if the data in their possession are judged legally.

In carrying out the invention and according to one aspect thereof, there is provided a digital signal processing apparatus comprising: a transmitter for transmitting inquiry information to an information center over a communication line, the inquiry information being generated based on digital data which have been recorded on a storage medium loaded by a customer into the apparatus after undergoing a predetermined low bit rate coding process; a receiver for receiving a result of an inquiry conducted by the information center based on the inquiry information; a discriminator for judging, based on the result of the inquiry, whether the digital data recorded on the storage medium are legitimately purchased data; and a controller which, if the discriminator judges the digital data to be legitimately purchased data, then executes a process to offer an additional service to the customer.

According to another aspect of the invention, there is provided a digital signal processing method including the steps of: transmitting identification information and inquiry information to an information center over a communication line, the identification information identifying digital data which have been recorded on a storage medium loaded by a customer into a terminal device after undergoing a predetermined low bit rate coding process and which are to be transmitted from the terminal device, the inquiry information being generated based on the digital data; receiving a result of an inquiry conducted by the information center based on the inquiry information; judging, based on the result of the inquiry, whether the digital data recorded on the storage medium are legitimately purchased data; and if the digital data are judged to be legitimately purchased data, then executing a process to offer an additional service to the customer.

According to a further aspect of the invention, there is provided a digital signal processing method including the steps of: receiving identification information and inquiry information from a terminal device over a communication line, the identification information identifying digital data which have undergone a predetermined low bit rate coding process and which are subject to an inquiry, the inquiry information being generated by the terminal device based on the digital data; retrieving the digital data subject to the inquiry from a digital data storage of the information center based on the identification information for identifying the digital data; generating reference inquiry information based on the retrieved digital data; comparing the generated reference inquiry information with the received inquiry information; generating an inquiry result based on a result of the comparison; and transmitting the generated inquiry result.

According to an even further aspect of the invention, there is provided an information center for judging whether digital data which have been recorded on a storage medium loaded into a terminal device and which have undergone a predetermined low bit rate coding process are legitimately purchased data, the information center including: a receiver for receiving identification information and inquiry information from the terminal device over a communication line, the identification information identifying the digital data which have undergone the predetermined low bit rate coding process and which are subject to an inquiry, the inquiry information being generated by the terminal device based on the digital data; a retriever for retrieving the digital data subject to the inquiry from a digital data storage of the information center based on the identification information for identifying the digital data; a reference inquiry information generator for generating reference inquiry information based on the retrieved digital data; a comparator for comparing the generated reference inquiry information with the received inquiry information; an inquiry result generator for generating an inquiry result based on a result of the comparison; and a transmitter which, if the comparison reveals a match between the generated reference inquiry information and the received inquiry information, then transmits predetermined service information to the terminal device.

According to a still further aspect of the invention, there is provided a data delivery system having an information center which has a storage of digital data having undergone a predetermined low bit rate coding process, and a terminal device which is connected to the information center by a communication line and which records digital data delivered from the information center onto a storage medium loaded by a customer; wherein the terminal device includes: a transmitter for transmitting inquiry information and identification information to the information center over the communication line, the inquiry information being generated based on the digital data which have been recorded on the storage medium after undergoing the predetermined low bit rate coding process and which are subject to an inquiry, the identification information identifying the digital data; a receiver for receiving a result of the inquiry conducted by the information center based on the inquiry information; a discriminator for judging, based on the result of the inquiry, whether the digital data recorded on the storage medium are legitimately purchased data; and a controller which, if the digital data are judged to be legitimately purchased data, then executes a process to offer an additional service to the customer; and wherein the information center includes: a receiver for receiving the identification information and the inquiry information from the terminal device, the identification information identifying the digital data which have undergone the predetermined low bit rate coding process and which are subject to the inquiry; a retriever for retrieving the digital data subject to the inquiry from the digital data storage of the information center based on the identification information for identifying the digital data; a reference inquiry information generator for generating reference inquiry information based on the digital data retrieved by the retriever; a comparator for comparing the reference inquiry information generated by the reference inquiry information generator with the inquiry information received by the receiver; an inquiry result generator for generating an inquiry result based on a result of the comparison by the comparator; and a transmitter for transmitting the inquiry result generated by the inquiry result generator.

According to these aspects of the invention, there is provided an information center for judging whether digital data which have been recorded on a storage medium loaded into a terminal device and which have undergone a predetermined low bit rate coding process are legitimately purchased data. The information center comprises: receiving means for receiving identification information and inquiry information from said terminal device over a communication line, said identification information identifying said digital data which have undergone said predetermined low bit rate coding process and which are subject to an inquiry, said inquiry information being generated by said terminal device based on said digital data; retrieving means for retrieving said digital data subject to said inquiry from a digital data storage of said information center based on said identification information for identifying said digital data; reference inquiry information generating means for generating reference inquiry information based on the retrieved digital data; comparing means for comparing the generated reference inquiry information with the received inquiry information; inquiry result generating means for generating an inquiry result based on a result of the comparison; and transmitting means which, if the comparison reveals a match between the generated reference inquiry information and the received inquiry information, then transmits predetermined service information to said terminal device.

Other objects, features and advantages of the invention will become more apparent upon a reading of the following description and appended drawings.

BRIEF DESCRIPTION OF THE DRAWINGS

FIG. 2 is a tabular view representing an information correspondence management table held in a main server or in the music server system shown in FIG. 1;

FIG. 3 is a block diagram of a low bit rate encoder for encoding digital audio data;

FIGS. 4A through 4D are graphic representations showing structures of orthogonal transformation blocks for bit compression;

FIG. 15 is a schematic flow diagram showing steps of authentication performed by the main server; and FIG. 16 is a schematic flow diagram depicting steps of authentication carried out by the music server system.

DESCRIPTION OF THE PREFERRED EMBODIMENTS

Preferred embodiments of this invention will now be described by referring to the accompanying drawings.

[Music Server System]

Figure 1:
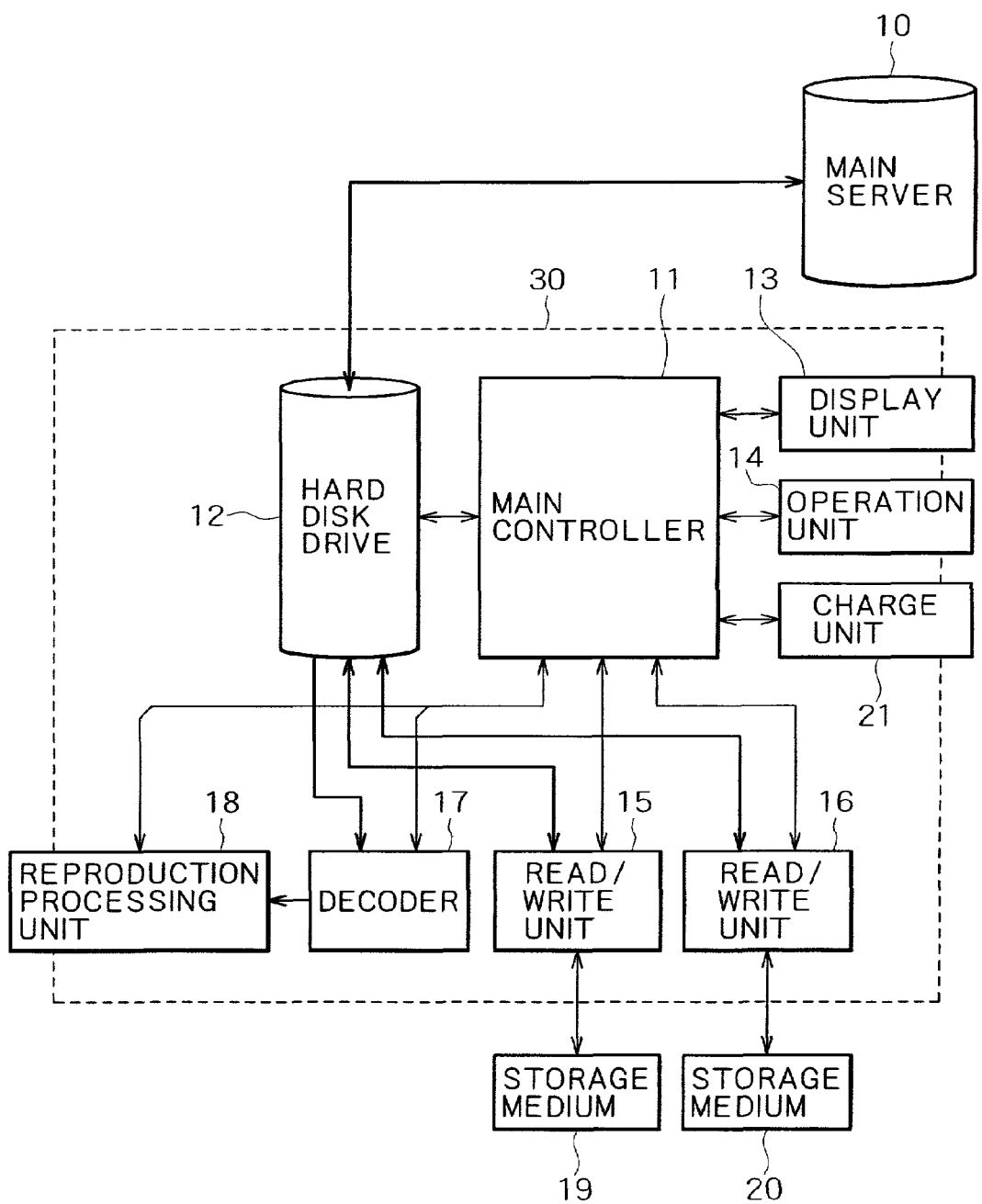
FIG. 1 is a block diagram outlining a basic structure of a music server system as a digital signal processing apparatus embodying the invention.

First to be described with reference to FIG. 1 is a music server system 30 which retains music data and records them to a user's storage medium. In FIG. 1, a main controller 11 is connected to all components of the music server system 30 for control of these devices. A hard disk drive 12 primarily stores music data to be offered to users. The music data held by the hard disk drive 12 of the music server system 30 includes main information (digital audio data) constituting actual music data, and additional information such as titles of pieces of music, their playing times, and jacket photos.

In the above embodiment, the digital audio data as main information are in a compressed format that ensures efficient use of the hard disk capacity and allows for the capacity of a communication channel for data transfer to the music server system. The compressed format, when made compatible with storage media to be described later, permits rapid writing of data to these media. Specific examples of so-called low bit rate coding will be described later in detail as a typical method for compressing digital audio data.

The additional information accompanying digital audio data as main information is managed illustratively by use of management table files whose structure is outlined in FIG. 2. The table files, associating main information file names with relevant additional information, are updated, retrieved and otherwise controlled by the main controller 11.

The example in FIG. 2 reveals that text information and image information as part of the additional information are also managed using files. Alternatively, the text information may be described directly in text. Also included in FIG. 2 is copyright information about the stored pieces of music along with so-called emphasis information.

Playing times of the stored pieces of music are managed likewise. Alternatively, the playing time of a given piece of music may be calculated whenever the corresponding music information needs to be displayed or the piece of music in question needs to be recorded. The calculation of the playing time is based on the size of the main information file in effect and the compression rate of the low bit rate coding method in use. Detected frame numbers, as will be described later in detail, constitute information to be referenced at the time of an authentication process. This process involves determining whether audio data recorded on the user's storage medium loaded in the inventive music server system have been legally purchased from a legitimate audio data vendor running the server system.

The additional information has been shown managed by use of table files as shown in FIG. 2. However, this is not limitative of the invention. Alternatively, the main information may entail various kinds of supplementary information in the form of headers.

A display unit 13, connected to the main controller 11, displays details of music data held by the hard disk drive 12 as well as recording and reproduction status of such data. An operation unit 14 under control of the main controller 11 serves to write and read data to and from the storage medium.

Although FIG. 1 outlines the music server system as an integral piece of equipment, this is not limitative of the invention. Alternatively, the display unit 13 of the server system may be replaced by a display unit of an externally established personal computer, and the operation unit 14 by a keyboard and a mouse of that PC. In such a case, the music server system is connected with the personal computer by use of a dedicated signal line transporting additional information and control signals or by means of a digital interface such as a serial port, a USB (universal serial bus) port, or an IEEE (Institute of Electrical and Electronics Engineers) 1394 port.

Although not shown in all details including a memory, a personal computer may constitute the entire music server system 30 in FIG. 1. Illustratively, the music server system 30 may be built as dedicated stand-alone equipment set up at a storefront; the server system may also be implemented within a computer environment such as that of a personal computer.

In FIG. 1, the read/write units 15 and 16 under control of the main controller 11 write and read data to and from external storage media 19 and 20. The read/write units 15 and 16 also read data from the external storage medium 19 or 20 and write what is read illustratively to the hard disk drive 12. Furthermore, the read/write units 15 and 16 may read data from the hard disk drive 12 and write what is retrieved to the external storage medium 19 or 20 under control of the main controller 11.

In this embodiment, the external storage media 19 and 20 are so-called package media that are easy to remove from the system and be loaded each into a small external player for reproduction of the recorded music data from the loaded medium. Such external storage media include illustratively a small-sized magneto-optical disc known as Mini-disc (MD; trademark) for music data recording and reproduction, and a Memory Stick (MS; trademark) as a sort of memory card. The embodiment may be provided with a plurality of read/write units to deal with different external storage media.

Details of compatible read/write units for processing music data vary from one type of external storage medium to another. This also holds for the formats in which to write data to different media. That means the music server system 30 must retain music data in formats that are compatible with the different external storage media being targeted. Although it is theoretically possible to share the main information between different formats through an inter-format converting process, the conversion is prone to cause degradation in sound quality.

In order to avoid possible sound quality deterioration, the music server system embodying the invention in FIG. 1 includes two independent read/write units 15 and 16 that address two different kinds of external storage media. For this embodiment, it is assumed that the storage medium 19 is an MD and the storage medium 20 is a Memory Stick (MS) and that the hard disk drive 12 has each piece of music stored therein as two kinds of music data whose formats are compatible with the MD and the MS.

How music data are typically recorded to an MD as the external storage medium will now be described. The read/write unit 15 for use with the MD has a write device made up of a spindle motor for MD rotation, an optical head, a magnetic head and a servo circuit.

The external storage medium 19 is an MD that constitutes a small-sized magneto-optical disc that is rotated by the spindle motor. With the optical head illustratively emitting a laser beam to the disc surface, the magnetic head applies onto the beam spot a magnetic field modulated according to the data to be recorded. The operations amount to a magnetically modulated recording process. During the process, the optical head is subjected to tracking control and focusing control based on servo signals from the servo circuit. That is, the optical head is operated precisely to scan MD tracks with the laser beam having an appropriate spot shape so that music data will be recorded accurately to the tracks.

In the above embodiment, the digital audio data (main information) are held compressed on the hard disk drive 12 using the same compressed format (of low bit rate coding method) as that of the MD. The compressed format allows digital audio data to be recorded in a shorter period than the actual playing time of the same data.

There is a music data management area called a TOC (table of contents) on each MD. The TOC accommodates additional information such as music titles. Based on the management information shown in FIG. 2, the main controller 11 causes the read/write unit 15 to record to the TOC any additional information about a given piece of music recorded on the hard disk unit 12. Recording of the additional information is done by use of a TOC format for the MD. This makes it possible for each external storage medium such as an MD to associate the main information with the relevant additional information in the manner shown in FIG. 2.

The read/write unit 16 has features for writing and reading data to and from a semiconductor memory within each Memory Stick (MS). Although a recordable MD has no area in which to record IDs of music composers or music titles, the Memory Stick (MS) does have such an area furnished inside. The read/write unit 16 may write such ID information representing music composers, music titles, etc., to that area in the Memory Stick (MS).

A decoder 17 is a data decompression device that decompresses digital audio data from the hard disk drive 12 in the inventive music server system for audio (music) reproduction. A detailed structure of the decoder 17 will be discussed later. When decoded by the decoder 17, the digital audio data are fed to a reproduction processing unit 18 for a reproduction process. The reproduction processing unit 18 includes an A/D converter, amplifiers and speakers.

The reproduction process carried out by the reproduction processing unit 18 allows a user to sample actually played pieces of music before recording the desired music data to the user's external storage medium. If there are two kinds of music data for the MD and MS as mentioned above, one decoder should be dedicated to the MD and another to the MS. Alternatively, this embodiment may let the decoder 17 decode compressed digital audio data only for the MD or for the MS.

[Music Server System's Usages and its Relations to a Main Server 10]

Typical usages of the music server system 30 are discussed below, together with its relations to a main server 10 that causes the music server system 30 to provide music data stored to the hard disk drive 12 of the server system 30.

The main server 10 shown in FIG. 1 is made up of a server system run by a legitimate vendor in possession of rights to market music data. The main server 10 has appropriately the same structure as the music server system 30 of this embodiment. In operation, the main server 10 offers new music data to the music server system 30 and designates erasure of old or unpopular music data from the hard disk drive 12 in the server system 30. In practice, the main server 10 updates or otherwise handles its music data by managing and controlling a large number of music server systems 30 dispersed in wide areas.

As described above, each music server system 30 of this invention is set up at the storefront of a CD shop or like establishments. In such a case, the music server system of FIG. 1 deals with a series of charge processes including the acceptance of charged money from users through a charge unit 21. In cooperation with the main controller 11, the charge unit 21 is also capable of managing the pricing of music data.

The user may bring his or her MD or other suitable external storage medium up to the storefront where the music server system is established, and loads the storage medium into the server system. The user then enters instructions through the display unit 13 and operation unit 14, selecting only the desired pieces of music data from those stored on the hard disk drive 12 of the music server system 30.

In response to the user's instructions, the music server system 30 retrieves the selected pieces of music data from the hard disk drive 12 and allows the user to sample the selected music by means of the decoder 17 and reproduction processing unit 18. The sampling helps the user to finalize the desired pieces of music data, and enters an indicated amount of money into the charge unit 21 of the music server system 30 preparatory to recording the data to the user's external storage medium. A recording instruction input by the user through the operation unit 14 causes the selected pieces of music data to be recorded to the storage medium.

In the manner described, the embodiment of the invention allows the user to purchase desired pieces of music data and record them to an external storage medium (typically the user's MD) through the music server system 30.

In the above embodiment, each music server system 30 is connected illustratively via a dedicated line to the main server system 10 of a vendor that markets music data. Illustratively, the main server 10 feeds music data periodically (e.g., once a month) to the music server system 30 so as to update the music data retained on the hard disk drive 12 therein.

If the music server system 30 is connected to the main server 10 via a dedicated high-speed data transmission line, the user may gain direct access to music data on the hard disk drive of the main server 10 every time a purchase is to be made. In that setup, the music server system 30 in FIG. 1 serves as a sort of automatic vending machine of music data.

As another alternative, the music server system may be established in the household. In this example, music data tapped from the main server 10 are transmitted illustratively over the Internet. The data may also be transmitted through digital signal communication links involving a communication satellite.

Unlike the music server system 30 set up at the storefront, the preceding setups have no need for a charge unit in the server system; charges are settled over the Internet or through telephone lines. Illustratively, users' member identification information and their credit card numbers are transmitted in encrypted format (to prevent data leaks) to music data vendors over the network. Purchases may be charged to the user's bank account or credit card account; bills may be issued requesting the user to pay at a later date; or other paying schemes may be utilized.

As yet another alternative, the music server system may be used as a system for tapping music data from the package media already owned by users and storing them onto other media. This setup requires installing an encoder for properly encoding the data that have been retrieved.

[Low Bit Rate Coding Method for Digital Audio Data]

Described below are examples of a typical low bit rate coding method for use with digital audio data, i.e., a data compression scheme for the digital audio data recorded as main information on the hard disk drive 12 of the inventive music server system. What follows is a description of one such coding method based on ATRAC (adaptive transform acoustic coding) for recording digital audio data onto the MD, a storage medium that has gained extensive popularity for distribution of music.

FIG. 3 is a block diagram of an ATRAC-based low bit rate encoder for encoding digital audio data. The low bit rate encoder of FIG. 3 divides an input digital audio signal into a plurality of frequency bands and performs an orthogonal transformation on each of the frequency bands. Of the resulting frequency-based spectrum data, those at low frequencies are assigned to bits on critical bands while the data at middle and high frequencies are assigned to bits on segmented critical band strips, in an adaptive manner in both cases. The critical bands at the low frequencies allow for the auditory characteristics of humans, and the segmented critical band strips derived from the critical bands provide for higher block floating efficiency.

Blocks to which the data bits are assigned usually constitute quantization noise generation blocks. This low bit rate encoder adaptively varies the size of bit-assigned blocks (i.e., block length) depending on the input signal prior to orthogonal transformation. In FIG. 3, an input terminal 100 is fed with digital audio data (audio PCM signal) at 0 to 22 kHz when the sampling frequency is 44.1 kHz. The input signal is divided by a band splitting filter 101 such as QMF (quadrature mirror filter) into signals on two bands: one at 0 to 11 kHz, and another at 11 kHz to 22 kHz. The 0-to-11 kHz band signal is further divided by a band splitting filter 102 (e.g., QMF) into a 0-to-5.5 kHz band signal and a 5.5-to-11 kHz band signal.

The 11-to-22 kHz band signal from the band splitting filter 101 is sent to an orthogonal transformation circuit such as an MDCT (Modified Discrete Cosine Transform) circuit 103 while also being fed to block determination circuits 109, 110 and 111.

The 5.5-to-11 kHz band signal from the band splitting filter 102 is supplied to an MDCT circuit 104 as well as to the block determination circuits 109, 110 and 111. The 0-to-5.5 kHz band signal from the band splitting filter 102 is sent to an MDCT circuit 105 as well as to the block determination circuit 109, 110 and 111.

The block determination circuit 109 determines a block size band on the signal fed thereto, and sends the determined block size information to the MDCT circuit 103, an adaptive bit assignment encoding circuit 106, and an output terminal 113. Likewise, the block determination circuit 110 determines a block size based on the signal fed thereto, and sends the determined block size information to the MDCT circuit 104, an adaptive bit assignment encoding circuit 107, and an output terminal 115. The block determination circuit 111 determines a block size on the basis of the signal sent thereto, and feeds the determined block size information to the MDCT circuit 105, an adaptive bit assignment encoding circuit 108, and an output terminal 117.

The block determination circuits 109, 110 and 111 determine their block sizes based on the time characteristics and frequency distribution of the signals fed thereto. The MDCT circuits 103, 104 and 105 perform the MDCT on the signals they receive from the QMF 101 or 102 in keeping with the block sizes communicated by the corresponding block determination circuits 109, 110 and 111.

FIGS. 4A through 4D are graphic representations showing examples of standard input signals in blocks of the different frequency bands, the signals being fed to the MDCT circuits 103, 104 and 105. In these examples, three filtered output signals, i.e., the 11-to-22 kHz signal from the QMF 101, the 5.5-to-11 kHz signal from the QMF 102, and the 0-to-5.5 kHz signal from the QMF 102, have each a plurality of orthogonal transformation block sizes of the respective bands. The time resolutions of the signals are varied depending on their time characteristics and frequency distribution.

More specifically, if the signal subject to orthogonal transformation is a quasi-stationary signal with little time-based variation, then the orthogonal transformation block size of the signal is set for 11.6 ms, i.e., for long mode shown in FIG. 4A. If the signal is a non-stationary signal with much time-based variation, then the orthogonal transformation block size of the signal is further split into two or four portions.

Where the signal is a non-stationary signal, the entire signal may thus be divided into four parts of 2.9 ms each, as shown in FIG. 4B as short mode. Alternatively, the signal may also be split partly into two portions of 5.8 ms each as shown in FIG. 4C as middle mode A, or divided partly into two portions of 5.8 ms each and partly into four portions of 2.9 ms each as indicated in FIG. 4D as middle mode B. Complex input signals that occur in practice are thus dealt with adaptively. If the capacity of the processing apparatus permits, the orthogonal transformation block size may be further divided in more complex fashion to aim at more effectiveness.

As shown in FIG. 3, the frequency-based spectrum data or MDCT coefficient data obtained by the MDCT circuits 103, 104 and 105 through their MDCT are fed to the adaptive bit assignment encoding circuits 106, 107 and 108 as well as to a bit assignment calculation circuit 118. Of such data, those at low frequencies converge on each critical band and those at middle and high frequencies are divided into segmented critical band strips to provide for block floating effectiveness.

The critical bands are frequency bands that are set apart to allow for the auditory characteristics of humans. When a pure tone of a given frequency is masked by the noise of a nearby narrow band having the same intensity as the pure-tone frequency, the band of that noise is defined as a critical band. The higher the frequency, the broader the critical band becomes. Illustratively, the entire 0-to-22 kHz frequency band is split into 25 critical bands.

Referring to FIG. 3, the bit assignment calculation circuit 118 calculates the quantity of masking and the energy level or peak value in each segmented band strip allowing for critical band segmentation and block floating efficiency. The calculation takes into account the so-called masking effect based on the block size information and the spectrum data or MDCT coefficient data discussed above. The result of the calculation is used as a basis for obtaining the number of bits assigned to each band, and the assigned bit count is fed to the adaptive bit assignment encoding circuits 106, 107 and 108 shown in FIG. 3.

The adaptive bit assignment encoding circuits 106, 107 and 108 submit their respective spectrum data or MDCT coefficient data to re-quantization (i.e., normalization followed by quantization) in keeping with the number of bits assigned to each segmented band allowing for the block size information, critical bands and block floating efficiency.

The data thus encoded are output through output terminals 112, 114 and 116 shown in FIG. 3. The output data are sent illustratively to processing circuitry for recording data onto a storage medium, or to processing circuitry for transmitting digital audio data from the main server 10 to the music server system 30. In the description that follows, the segmented band strips serving as units for bit assignment are called unit blocks.

The bit assignment calculation circuit 118 analyzes status of tone components based on the spectrum data or MDCT coefficient data. At the same time, the calculation circuit 118 calculates the number of bits assigned to each unit block to determine data distribution while taking into account the masking effect as well as such existing effects as minimum audible curves and equal loudness curves specific to the human hearing. The block size information discussed above is also considered in the calculation.

The bit assignment calculation circuit 118 also determines scale factors as normalized data representative of block floating status of the unit blocks. More specifically, a number of positive values are provided in advance as scale factor candidates. Of these positive values, those that exceed a maximum absolute value of the spectrum data or MDCT coefficient data within each unit block are selected. Of the selected values, the smallest is adopted as the scale factor of the unit block in question.

Scale factors may be numbered using a plurality of bits in correspondence with actual values, and these numbers may be stored in a ROM or like means (not shown). The scale factors are numbered illustratively at intervals of 2 dB. A scale factor determined in the above-described manner for a given unit block is represented by the corresponding number that is used as sub information denoting the scale factor for the unit block in question.

[Low Bit Rate Coding Format for Digital Audio Data]

Figure 5:
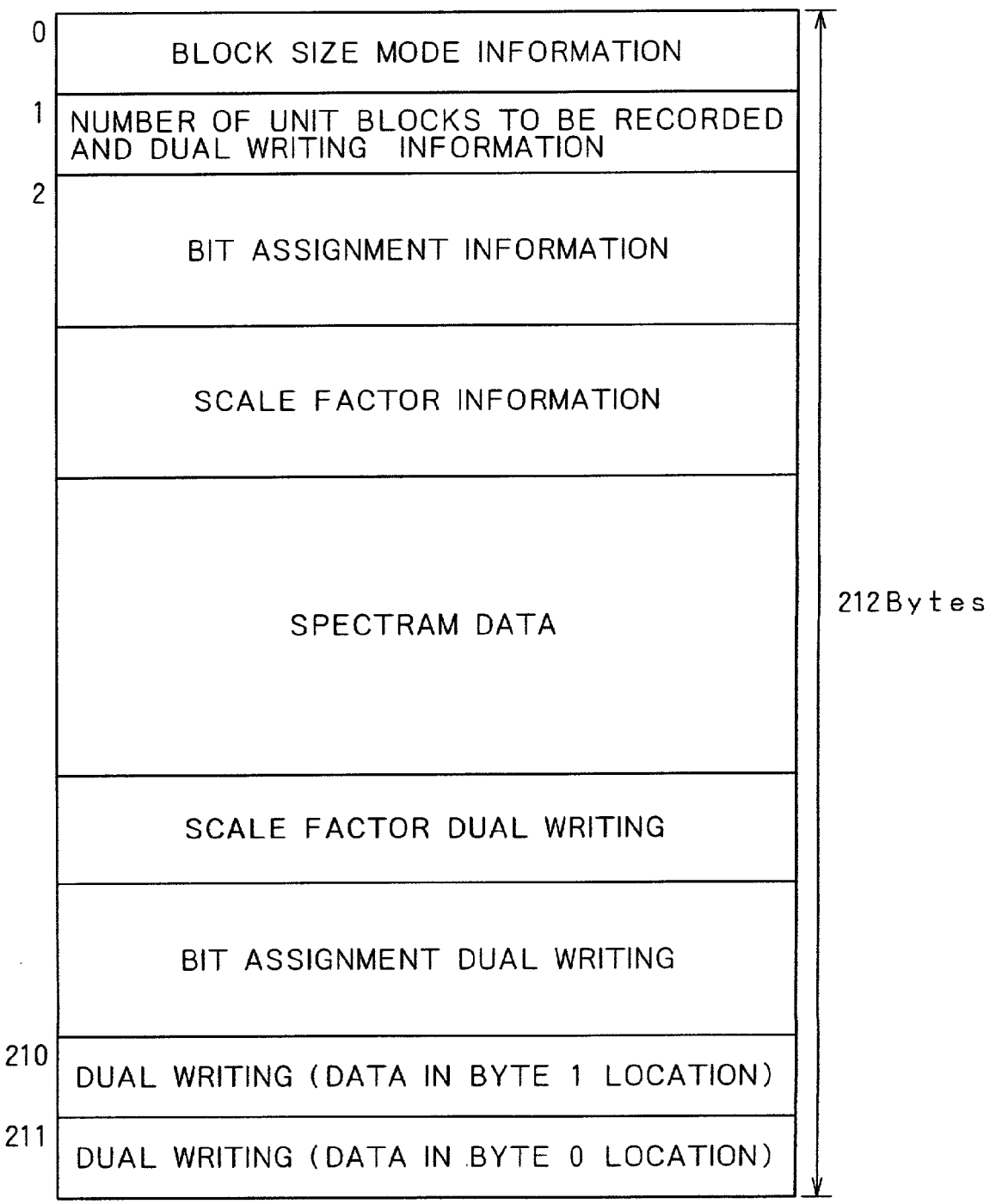
FIG. 5 is a schematic view showing a typical low bit rate coding format.

Discussed below with reference to FIG. 5 is a typical coding format in which digital audio data are encoded. Numbers indicated on the left-hand and right-hand sides of FIG. 5 represent byte counts. In this example, one frame (one sound frame) is constituted by 212 bytes.

Referring to FIG. 5, a byte-zero location at the top retains block size information about the bands determined by the block determination circuits 109, 110 and 111 in FIG. 3. A byte-one location following the byte-zero location accommodates information representing the number of unit blocks to be recorded. Illustratively, the higher the frequency, the closer the assigned bit count is to zero and the less need for recording. This peculiarity is reflected properly in setting the number of unit blocks to be recorded. That is, a far larger number of bits are assigned to the medium and low frequencies that appreciably affect human auditory characteristics than to the low frequencies.

The byte-one location also retains the number of unit blocks in which the above-mentioned bit assignment information and scale factor information are performed dual writing. The dual writing is intended for error correction and involves copying data in given byte locations to other byte locations. The greater the amount of dual writing, the higher the resistance to error; the smaller the amount of dual writing, the larger the number of bits that may be used in spectrum data constituting actual digital audio data.

This embodiment establishes independently the number of unit blocks performing dual writing for each of the above-mentioned bit assignment information and scale factor information, whereby the resistance to error and the number of usable bits in the spectrum data are adjusted. For each of the different categories of information, the correspondence between the code in the stipulated bits and the unit block count is defined beforehand as part of the format.

Figure 6:
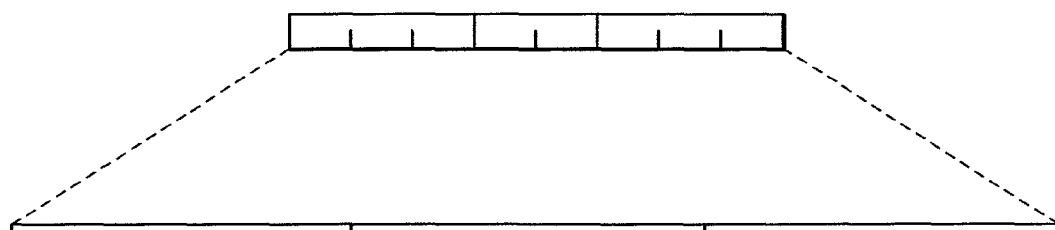
FIG. 6 is a tabular view detailing typical data at the byte-one location in FIG. 5.

FIG. 6 is a tabular view detailing typical data recorded in eight bits constituting the byte-one location in FIG. 5. As shown in FIG. 6, three of the eight bits in the byte-one location denote the number of unit blocks for actual recording; two of the remaining five bits represent the number of unit blocks in which bit assignment information is performed dual writing, and the last three bits denote the number of unit blocks in which scale factor information is performed dual writing.

Locations following byte two in FIG. 5 retain bit assignment information about unit blocks. Illustratively, it may be determined beforehand that four bits in the format are used to record bit assignment information about a single unit block. This allows bit assignment information to be recorded successively about as many unit blocks as are actually recorded as shown in FIG. 5 starting from unit block zero.

Subsequent to the bit assignment information thus recorded, scale factor information about unit blocks is retained. It may be stipulated beforehand that six bits in the format be used to record scale factor information per unit block. This allows scale factor information to be recorded successively about as many unit blocks as are actually recorded starting from unit block zero, as in the case of bit assignment information recording.

After the scale factor information, spectrum data about unit blocks are recorded. The spectrum data are also recorded successively about as many unit blocks as are actually recorded starting from unit block zero. The number of spectrum data per unit block is defined beforehand in the format. This allows the spectrum data to correspond with the relevant bit assignment information. No spectrum data are recorded regarding any unit block to which no bit is assigned.

Subsequent to the spectrum information, the above-mentioned scale factor information is performed dual writing about the unit block in question together with the bit assignment information dual writing. The way the two kinds of information are recorded by dual writing is the same as that in which the scale factor information and bit assignment information are recorded as described above, except that the unit block count is made to correspond with the duplicate information as shown in FIG. 6.

The last two bytes accommodate information that is a duplicate of what is in the byte-zero and byte-one locations as indicated in FIG. 5. The writing of information in duplicate in the two bytes is stipulated as part of the format. Unlike the dual writing of the scale factor information or bit assignment information, the amount of duplicate information written in the two bytes cannot be varied.

The bit assignment calculation circuit 118 in FIG. 3 obtains three kinds of information: main information made up of data derived from the orthogonal transformation output spectrum data processed by use of sub information; scale factor data representative of block floating status as sub information; and a word length. With the information thus acquired, the calculation circuit 118 causes the adaptive bit assignment encoding circuits 106, 107 and 108 to carry out re-quantization accordingly in order to encode the data in the coding format in effect.

The digital data encoded as described by the low bit rate coding method of this embodiment are stored in the coding format of FIG. 5 on the hard disk drive 12 of the music server system 30. In response to a request from a user, data are retrieved from storage and recorded to the user's MD via the read/write unit 15. The above-described low bit rate coding method is merely an example. Digital audio data encoded by other suitable methods may also be handled by the music server system 30 of this embodiment.

[Decoding of Digital Audio Data Encoded by Low Bit Rate Coding Method]

Figure 7:
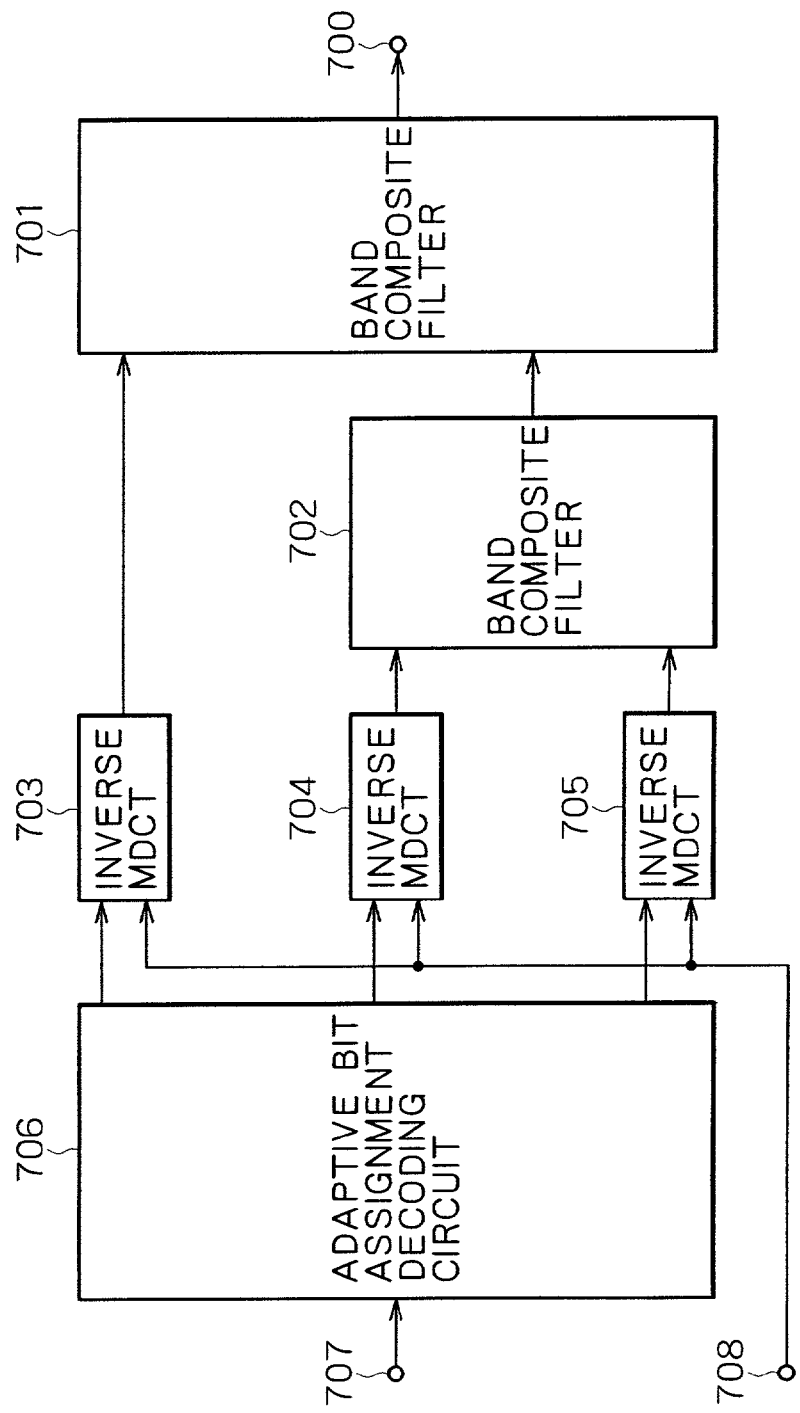
FIG. 7 is a block diagram of a low bit rate decoder for decoding digital audio data encoded by the low bit rate encoder of FIG. 3.

Discussed below are ways to decode digital audio data encoded by the low bit rate coding method as described above. FIG. 7 is a block diagram of a typical low bit rate decoder for decoding digital audio data encoded by the low bit rate encoder of FIG. 3. The low bit rate decoder of FIG. 7 corresponds to the decoder 17 of the music server system 30 shown in FIG. 1.

Quantized MDCT coefficients on the different frequency bands, i.e., data (spectrum data) equivalent to the output signals from the output terminals 112, 114 and 116 in FIG. 3, are fed to an adaptive bit assignment decoding circuit 706 through a decoding circuit input terminal 707 as shown in FIG. 7. The block size information in use, i.e., data equivalent to the output signals from the output terminals 113, 115 and 117 in FIG. 3, is supplied to inverse orthogonal transformation (IMDCT) circuits 703, 705 and 705 through an input terminal 708 as depicted in FIG. 7.

Given the spectrum data, the adaptive bit assignment decoding circuit 706 decodes the bit assignment of the data using adaptive bit assignment information. The resulting spectrum data on the low, middle and high frequency bands are sent to the corresponding IMDCT circuits 703, 704 and 705. In turn, the IMDCT circuits 703, 704 and 705 subject the spectrum data as frequency-based signals to inverse orthogonal transformation for conversion into time-based signals.

The time-based signals on the different bands are fed to band composite filters (IQMF circuits) 702 and 701 as shown in FIG. 7. The band composite filters 702 and 701 compose the supplied time-based signals into decoded digital audio data as an all-band signal.

As described, the digital audio data encoded by the low bit rate coding method are made to undergo the stages of bit assignment decoding, inverse orthogonal transformation, and band composition before becoming the uncoded digital audio data. The audio data thus decoded can be played back and listened to.

The above-described steps of low bit rate coding and decoding of audio data are carried out in like manner by an MD recorder-player that adopts the MD as its storage medium.

[Structure of the Main Server 10]

A typical structure of the main server 10 in FIG. 1, which corresponds to a music data vender's database server, will now be described by referring to the block diagram of FIG. 8. The main server 10 shown in FIG. 8 has approximately the same structure as the music server system 30 in FIG. 1. The main controller 11, hard disk drive 12, display unit 13, operation unit 14, decoder 17, and reproduction processing unit 18 in FIG. 1 correspond respectively to a main controller 81, a hard disk drive 82, a display unit 83, an operation unit 84, a decoder 87, and a reproduction processing unit 88 in FIG. 8. The corresponding components provide like or equivalent functions.

Figure 8:
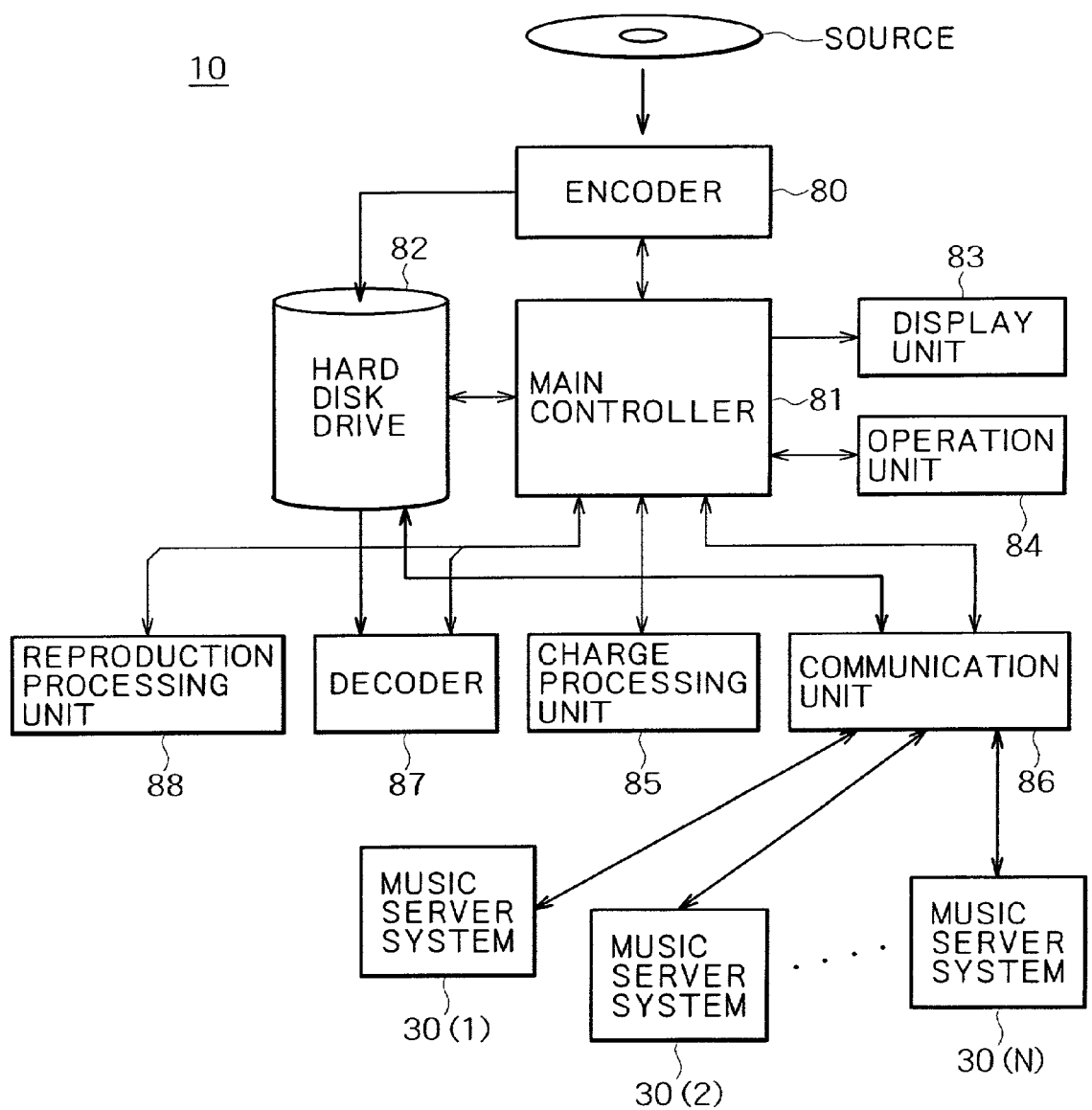
FIG. 8 is a block diagram indicating a basic structure of the main server shown in FIG. 1.

A charge processing unit 85 in FIG. 8 receives and processes charge information from each music server system 30. A communication unit 86 communicates with music server systems 30(1), 30(2), . . . , 30(N) set up in different stores or establishments. The exchanged data include music data, additional information, and charge information. Although each music server system 30 also includes a communication unit for data exchanges with the server, that unit is not shown in FIG. 1.

In the main server 10 of FIG. 8, an encoder 80 performs a low bit rate coding process on PCM samples and has the structure shown in FIG. 3. That is, the PCM signal serving as a music source is encoded by the encoder 80 using the low bit rate coding method under control of the main controller 81. The encoded signal is stored onto the hard disk drive 82.

Structured as depicted in FIG. 3, the encoder 80 is implemented in practice in one of two ways: by hardware or by software. The encoder 80 may be implemented either by a hardware component (e.g., MD deck) incorporating an encoder LSI, or by software elements that compute and process PCM files.

The main server 10 in FIG. 8 is generally required to perform an encoding process that should deal with large quantities of music data automatically and efficiently in order to run a digital audio data delivery business. The main server 10 of this embodiment has its encoding process implemented by software.

[Differences Between Encoding by Hardware and Encoding by Software]

As discussed above, digital audio data are encoded by the low bit rate coding method either on a hardware basis or on a software basis. What is noticeable is that digital audio data (PCM data) encoded by different pieces of hardware turn out to be quite different from one another. This feature is taken advantage of when the music server system 30 of FIG. 1 is to check simply and reliably whether the digital audio data found on a user's MD have been purchased from the system in question.

Anyone who possesses a suitable piece of hardware (MD deck) may have music data encoded similarly by the low bit rate coding method, except that the computing accuracy of encoding is dependent on the precision of the encoder LSI incorporated in the hardware. Where PCM files are used, digitally output PCM data are generally input digitally to undergo an encoding process. In that case, when a given piece of music is encoded by different decks, the piece has its input position of the digitally input PCM data varied quite distinctly depending on how recording operation is timed to start. The resulting encoded data can be thoroughly different from one deck to another.

More specifically, a soundless portion provided at the start of a CD recording can vary in recorded length depending on how recording operation is timed to start. It is thus highly likely that different pieces of hardware produce differently encoded data sequences.

As an explanation of the above phenomenon, a unit of time in which to encode data by the low bit rate coding method is described below in detail by referring to FIG. 3 showing a typical low bit rate encoding setup. In the setup of FIG. 3, the input terminal 100 is fed with digital audio data (PCM data). Given the input, the MDCT circuits 103, 104 and 105 deal with a predetermined number of samples during their orthogonal transformation (MDCT). The sample count is regarded as a unit that is repeated during the process.

In the low bit rate encoding setup of FIG. 3, 1,024 samples of PCM data entered through the input terminal 100 are output by the MDCT circuits 103, 104 and 105 as 512 items of MDCT coefficient data or spectrum data. More specifically, 1,024 pieces of PCM data (PCM sample data) entered through the input terminal 100 are processed by the QMF 101 into 512 high-frequency samples and 512 low-frequency samples. The 512 low-frequency samples are further processed by the QMF 102 into 256 low-frequency samples and 256 middle-frequency samples.

The 256 low-frequency samples from the QMF 102 are processed by the MDCT circuit 105 into 128 low-frequency spectrum data items; the 256 middle-frequency samples from the QMF 102 are processed by the MDCT circuit 104 into 128 middle-frequency spectrum data items. The 512 high-frequency samples from the QMF 101 are processed by the MDCT circuit 103 into 256 high-frequency spectrum data items. A total of 512 spectrum data items are thus generated out of the 1,024 PCM samples.

The input data made up of the 1,024 PCM sample data items constitute a time unit for a single pass of low bit rate encoding. This time unit is considered one frame (one sound frame). A low bit rate-encoded single frame includes 212 bytes as shown in FIG. 5.

The PCM sample data entered through the input terminal 100 in FIG. 3 contain 1,024 samples per frame. Of the 1,024 samples making up each.frame, the first and the second half of 512 samples each are also used by the preceding and the immediately ensuing frame respectively. This arrangement is intended to provide for data overlaps during MDCT so as to accomplish accurate encoding.

One frame of digital audio data encoded by the low bit rate coding method is generated from the 1,024 samples of PCM data. For that purpose, 1,024 samples of PCM data to be input first are determined based on the timing of the start of recording operation. The frame constituted by the 1,024 samples thus determined is followed by other frames of similarly encoded data.

Because of data overlaps, there can be theoretically 512 input patterns. For that reason, commonly used hardware devices (MD decks) find their encoded digital audio data varied depending on the timing of the start of recording operation. Methods of analog recording obviously present more difficulty in accomplishing data coincidence because such methods are further affected by the presence of noise and the accuracy of A/D conversion.

Having digital audio data encoded by software on a personal computer, by contrast, involves processing PCM files stored on the hard disk. In this case, because there are no factors that might trigger encoding timing discrepancies, processing of the same piece of music always generates identically encoded digital data.

Generally, encoder LSIs incorporated in hardware devices (MD decks) have lower levels of computation accuracy than the CPU of a processing apparatus such as a personal computer executing encoding software. Where encoder LSIs perform an encoding process on the same PCM sample data, the resulting encoded digital audio data can be quite different because of the hardware components' low degrees of computation accuracy.

As mentioned earlier, the recordable MD has no area in which to record information identifying the source of music data held on the disc. However, if the music data vendor's encoder alone is designed to perform a software-based encoding process, then the above-described characteristic makes it possible theoretically to determine whether the encoded digital audio data found on a given MD have been purchased over a network from the same vendor through the music server system 30 upon comparison with the corresponding data in the main server 10 or on the hard disk drive 12 of the server system 30. A mismatch between the two groups of data reveals that the encoded data on the MD have been recorded through a hardware encoder illustratively from a CD in the household.

The above characteristic can be utilized in offering various services, such as moving music data between different storage media, upgrading the version of the low bit rate coding algorithm for a given set of data, analyzing a defective storage medium, and many other services that could not be conventionally provided.

[Example of Conventionally Unavailable Services that are Offered by the Invention]

A need for the service of moving music data between different storage media is recognized by any user who, given a wide selection of diverse external storage media such as the MD and MS (Memory Stick), wants to abandon one storage medium type in favor of another as a major vehicle of music entertainment illustratively upon purchase of a new player device.

One way for the user to move music directly from one storage medium to another is by simply outputting desired pieces of music in analog format and having them copied on the target medium. This method entails the intervention of an analog-to-digital or digital-to-analog conversion process, which can result in degradation of sound quality.

Another way is to move data digitally between storage media. In that case, a mismatch in low bit rate coding method between the media will require the intervention of decoding and encoding processes, which can also incur deterioration of sound quality. A coincidence in low bit rate coding method between the storage media involved permits direct data duplication therebetween but can lead to copyright infringement because of the absence of sound quality degradation in the process.

In terms of sound quality, desired music data should ideally be encoded according to the low bit rate coding method applicable to the new storage medium for which the data to be written are destined. This, however, requires the user to pay again for the music data in the new format to comply with the destination storage medium even if the music data currently held on the old storage medium were purchased through the same music server system 30. The practice could be perceived as redundant and costly by the user.

The problem above is circumvented by letting the user move the music data from the old storage medium to the new medium free of charge or at a lower price than what first-time purchasers are asked to pay, on one condition: that the low bit rate-encoded data held on the old storage medium be judged to have been purchased legally from a legitimate music data vendor through the music server system 30.

The service of moving music data between different storage media is but one example of new services made available by the invention. The point is, as described, that the music data held on the current storage medium will be judged reliably and accurately to have been purchased legally from the legitimate music data vendor through the music server system 30.

[Process to Determine Whether Music Data Held on an External Storage Medium have been Legally Purchased]

Figure 9:
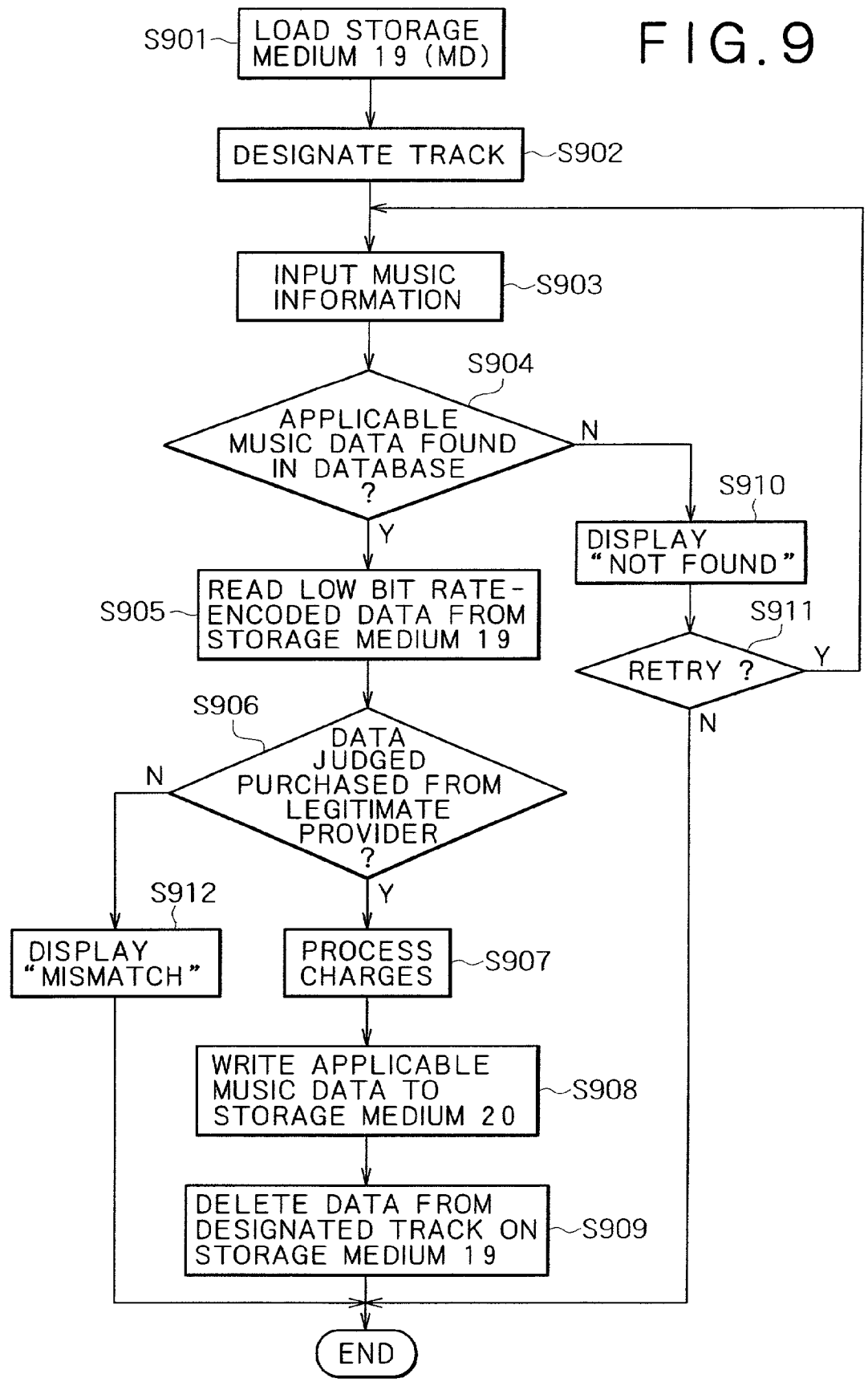
FIG. 9 is a flowchart of steps constituting an authentication process and a process of moving music data between storage media, both processes being performed by the music server system of FIG. 1.

Described below with reference to the flowchart of FIG. 9 is how to determine whether low bit rate-encoded digital audio data held on a user's MD have been legally purchased from a legitimate music data vendor through the music server system 30. The steps constituting the process in FIG. 9 are carried out primarily by the main controller 11 of the music server system 30.

In the process of FIG. 9, a check is first made to see if the encoded digital audio data held on the user's MD have been purchased through the music server system 30. If the data are judged to have been purchased in that manner, then the data are moved to another storage medium (MS or Memory Stick in this example). With this embodiment, as described, the storage media 19 and 20 for use by the music server system 30 in FIG. 1 are an MD and an MS respectively.

In step S901 of FIG. 9, the music server system 30 in FIG. 1 detects an external storage medium 19 (MD) which is loaded into the read/write unit 15 and which is supposed to carry music data purchased through the system 30.

In step S902, of the data recorded on the inserted storage medium 19, the track of the music data desired to be moved is input and received. The track information is transmitted to the main controller 11 shown in FIG. 1.

In step S903, the music server system 30 accepts input of information designating the music data to be moved. Given the designating information in step S903, the music server system 30 goes to step S904 and identifies the music data to be moved by referencing the database (FIG. 2) in the possession of the music data vendor.

The process of step S904 involves searching for the music data to be inquired about in a subsequent step S906. The information accepted in step S903 may include music titles and artist names. The greater the amount of information entered in step S903, the quicker and more reliable the search for the music data of interest.

If the desired music data are not found in step S904, the music server system 30 reaches step S910 and gives an indication that the applicable music data are not found. In step S911, a check is made to see if a retry instruction is accepted from the user designating another attempt to search for the data in question. If the retry instruction is judged accepted in step S911, the music server system 30 goes back to step S903 and repeats the subsequent steps. If no retry instruction is judged accepted in step S911, the processing of FIG. 9 is terminated.

If in step S904 the desired music data are judged to be found in the database, step S905 is reached. In step S905, the low bit rate-encoded music data of interest are read from the storage medium 19 (MD) in the read/write unit 15 preparatory to a data match.

Although the whole encoded data could be read in step S905, the read operation is performed much faster if only a certain frame (sound frame) indicated by a detected frame number is read from the database shown in FIG. 2. More than one frame read in step S905 will increase the accuracy of data matching.

In step S906, the music server system 30 checks to see if the low bit rate-encoded data read from the user's storage medium 19 are those purchased from the provider (i.e., music data vendor) running the system 30 of this embodiment.

As mentioned above, the check in step S906 is based on the assumption that the music data vendor encodes digital audio data using software. The check involves comparing a predetermined frame (a sound frame of 212 bytes) of the vendor's applicable music data with the corresponding frame (also a sound frame of 212 bytes) read from the user's storage medium 19.

If there occurs a mismatch in step S906, then step S912 is reached in which the display unit 13 in FIG. 1 gives a mismatch indication. Then the processing of FIG. 9 is terminated. A more detailed indication in step S912 may be a message such as this: "The music data you wish to move have not been sold through this system. Please check again."

If there is a match in step S906, step S907 is reached in which charges are settled by means of the charge unit 21. As described above, the service may be offered at a reduced price or free of charge. If the service is provided gratuitously, then step S907 may generate a message such as this: "There will be no charge. You can move the music data for free."

In step S908, the low bit rate-encoded music data compatible with the user's new storage medium 20 (MS) are written to that medium loaded in the read/write unit 16. In step S909, the track holding the music data information in question on the old storage medium 19 (MD) is deleted therefrom by the read/write unit 15. This terminates the processing in FIG. 9.

In step S907, the user may be asked to pay a certain amount of money for the new purchase and may agree to make that payment. In that case, the music data need not be deleted from the old storage medium in step S909. This constitutes not a data moving operation but a copy operation that is, as a new service involving the copy of new-format data to the new storage medium.

Alternatively, it is possible to go directly from S902 to step S905 and bypass step S903 for accepting the information designating the music data. This alternative involves comparing the music data in question with all music data in the possession of the music data vendor for a data match. The process requires reading a certain number of frames for a matching operation, which takes some time to accomplish.

Some storage media may be arranged to carry information indicating that a vendor has done specific encoding to the media. Directly referencing that information provides execution of the process in step S906. This scheme, if adopted, eliminates the need for steps S903, S904, S905, S910 and S911.

As described, the simple comparison based on the sound frame of 212 bytes permits verifying easily and reliably whether the music data recorded on an external storage medium have been offered by the music data vendor running the music server system in which the medium is loaded. The result of the comparison serves as a basis for new services to be implemented by the music server system 30, such as those of moving and copying music data between different storage media.

With this embodiment, the processing of FIG. 9 is carried out entirely inside the music server system 30. As an alternative, the main server may be connected via a high-speed data transmission arrangement to personal computers set up in individual households. In that case, the PCs may execute steps S901, S902, S903, S905, S908, S909, S910, S911 and S912, the main server performing steps S904, S906, S907 and S908.

The alternative setup above involves a connected household personal computer initially sending information about the music of interest to the main server for an inquiry. The personal computer further transmits a certain frame of the music data held on the storage medium 19 (MD) to the main server.

Based on the information about the music inquired by the household personal computer, the main server searches for the applicable music that may be stored on its hard disk (equivalent to step S904 above). If the music data of interest are found on the hard disk, a relevant frame of the detected music data is compared with the music data frame received from the personal computer (i.e., step S906). Charges are then settled as needed according to the result of the comparison (step S907), and the result of the inquiry is sent to the personal computer. Given the inquiry result, the personal computer may give a "mismatch" indication (equivalent to step S912) or may move the music data (steps S908 and S909).

[Variations of New Services]

Described below are variations of new services provided by the inventive system on the assumption that it is possible to ascertain easily and reliably whether the music data held on an external storage medium have been offered legally by a music data vendor running the music server system in which the medium is loaded. In the description that follows, storage media A and B are assumed to be of different storage types, e.g., an MD and an MS respectively.

Figure 10:
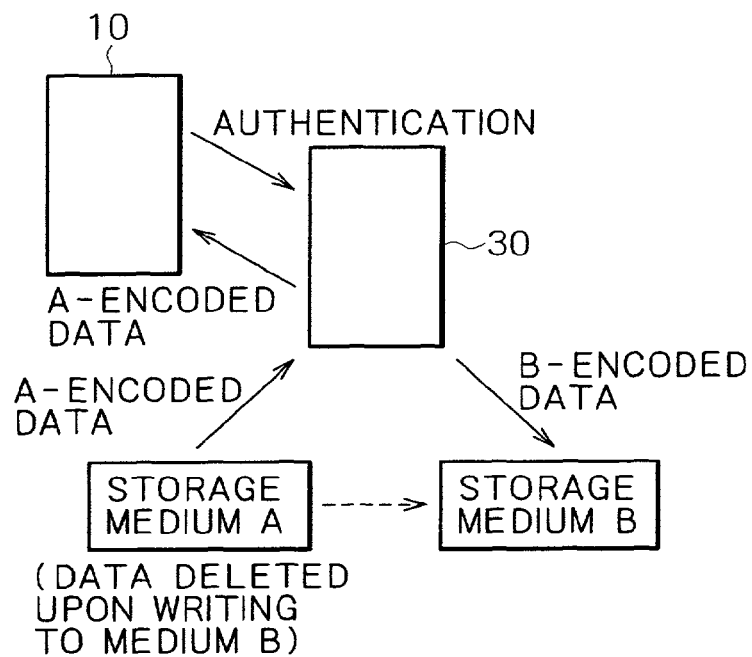
FIG. 10 is a schematic flow diagram illustrating a typical flow of data in effect when a music data moving service is offered by the music server system.

FIG. 10 is a schematic flow diagram for explaining the service of moving music data between different types of storage media. The diagram illustrates a typical flow of data in effect when the music data moving service is offered by the music server system as described above with reference to FIG. 9. With this service, as sketched in FIG. 10, a comparison is made between a specific sound frame of A-encoded data constituting music data of interest held on the storage medium A on the one hand, and the corresponding sound frame of A-encoded data constituting the same music data stored in the main server 10 or in the music server system 30 on the other hand. In case of a match between the frames, B-encoded data making up the same music data are transferred from system storage to the user's storage medium B and recorded thereto.

The music data are actually moved in the flow indicated by arrowed solid lines in FIG. 10. The flow ranges from reading of the A-encoded data for a data match to the transfer of the B-encoded data. From the user's viewpoint, the data are apparently moved between the two storage media as indicated by an arrowed broken line. If the A-encoded data are left unerased on the storage medium A, the apparent operation of the arrowed broken line is perceived as a copy operation.

Figure 11:
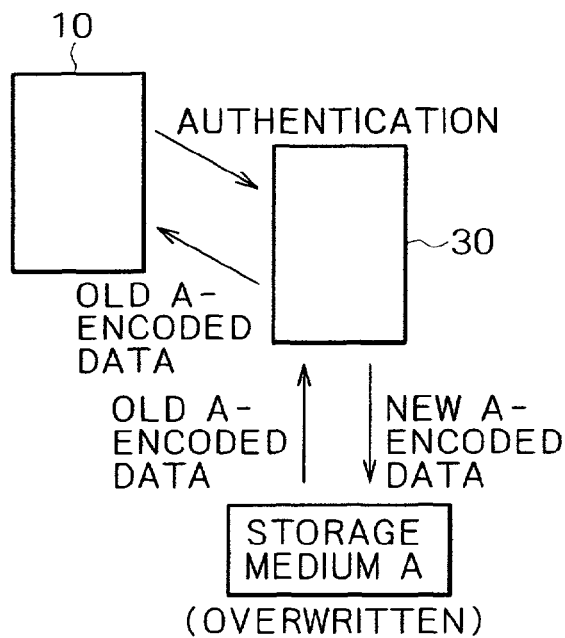
FIG. 11 is a schematic flow diagram presenting a typical flow of data in effect when a music data coding method version upgrade service is offered by the music server system.

FIG. 11 is a schematic flow diagram presenting a typical flow of data in effect when the music server system offers the service of upgrading the version of the low bit rate coding algorithm used to copy music data from one storage medium to another medium of the same type (e.g., from MD to MD). The coding algorithm thus upgraded permits execution of a greater number of low bit rate coding operations per unit time providing a higher grade of music quality. During the process, step S908 of FIG. 9 is carried out to execute an overwrite operation on the storage medium A while step S909 is eliminated. Charges may be settled as needed in step S907. Alternatively, the charging step may be bypassed to let the user obtain the data for free.

In the example of FIG. 11, the music server system 30 generated the new A-encoded data. As an alternative, the main server 10 may generate the new A-encoded data that are recorded to the storage medium A through the music server system 30. This setup allows the main server side to perform version upgrades as needed.

Figure 12:
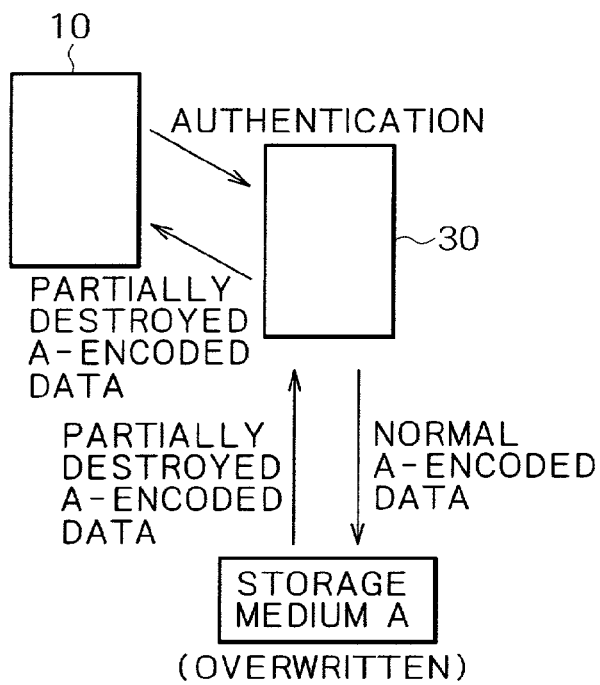
FIG. 12 is a schematic flow diagram portraying a typical flow of data in effect when a music data rewrite service is offered by the music server system rewriting partially destroyed music data.

FIG. 12 is a schematic flow diagram portraying a typical flow of data in effect when the music server system offers an overwrite service of rewriting partially destroyed music data on a single storage medium. The service may be resorted to when music data have been destroyed in areas other than the detected frame targeted for comparison or have otherwise failed to be recorded correctly. The steps involved are the same as those in FIG. 11.

In the example of FIG. 12, the music server system 30 generated the normal A-encoded data. Alternatively, the main server 10 may generate the normal A-encoded data that are written to the storage medium A through the music server system 30.

Figure 13:
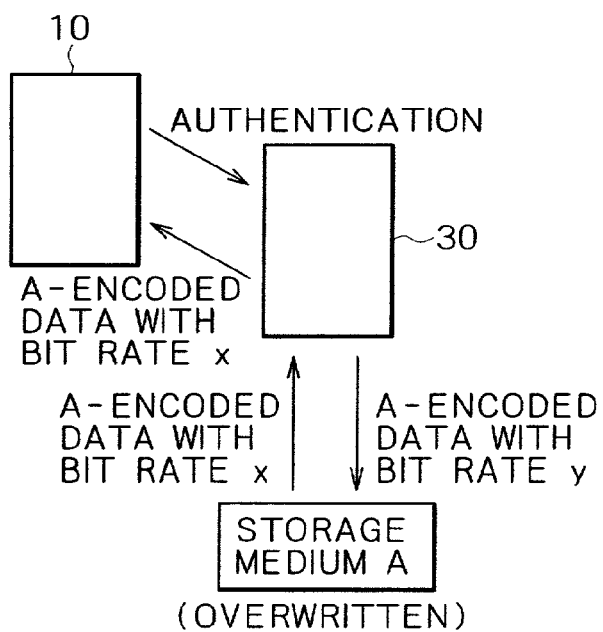
FIG. 13 is a schematic flow diagram indicating a typical flow of data in effect when a music data bit rate changing service is offered by the music server system.

FIG. 13 is a schematic flow diagram indicating a typical flow of data in effect when the music server system offers another overwrite service of rewriting music data on the same storage medium. The service may be utilized illustratively where it is desired to replace the bit rate of encoded music data with a new bit rate also compatible with the storage medium A. The bit rate alteration of the same data is effected by an overwrite operation on the single medium. The steps involved are the same as those in FIG. 11.

In the example of FIG. 13, the music server system 30 generated A-encoded data with a new bit rate "y." Alternatively, the main server 10 may generate the A-encoded data having the bit rate "y" which are recorded to the storage medium A through the music server system 30.

Where a customer database is formed, registered customers may each be issued a password for management purposes. The password will allow the relevant customer to receive new services regarding the previously purchased music data.

Figure 14:
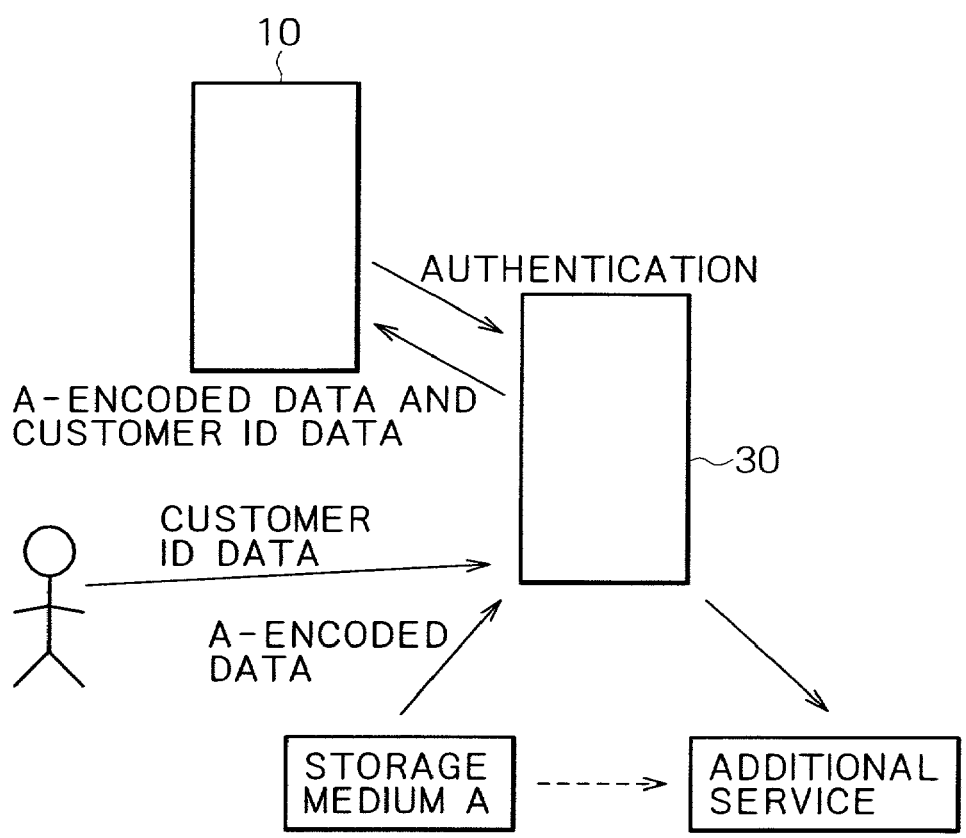
FIG. 14 is a schematic flow diagram sketching a typical flow of data in effect when an additional service is offered by the music server system regarding music data.

FIG. 14 is a schematic flow diagram sketching a typical flow of data in effect when the music server system offers an additional service with respect to purchased music data. The service may involve providing something extra regarding the music data already held on the storage medium brought in by a customer who is authenticated illustratively using a specific password serving as customer identification data. The authentication will be based on the matching of both the music data and the customer identification data.

Customer identification data are utilized to prevent the same customer from receiving the same additional service more than once. A typical additional service may be a gift offered to any customer who has purchased, say, at least 10 pieces of music so far of an artist A. The storage medium holding the music data should be usable only once for the additional service to be received by the customer whose identify is verified by referencing the customer database.

The additional service in the setup of FIG. 14 may illustratively involve providing a customer with a bonus track produced by the music-producing party (singer, composer, lyricist, etc.) whose music has been purchased by the customer in question. Another service may involve distributing a picture of the music-producing party whose music has been purchased through the music server system, in compressed image data such as those in JPEG (Joint Picture Expert Group) or GIF format, so that the distributed picture may be printed at the user's terminal. Another service may involve the music server system distributing, in the form of electronic data, discount coupons for the purchase of package media such as CDs of the music-producing party in question, or courtesy tickets to concerts to be held by that party. The coupons or tickets may be printed at the user's terminal before use. Yet another service may involve allowing each customer to add up points upon every purchase so that the customer at a later date may receive discounts or gifts proportional to the points accumulated.

In the example of FIG. 14, the music server system 30 generated additional service information. Alternatively, the main server 10 may generate the additional service information that is recorded to the storage medium A via the music server system 30.

In any one of the setups in FIGS. 10 through 14, as described, simply comparing a predetermined sound frame as part of the music data held on the external storage medium loaded in the music server system 30 with the corresponding sound frame of the applicable music data retained in the main server 10 provides a reliable verification of whether the music data on the external storage medium have been purchased legally from the music data vendor running the music server system 30.

The viability of the authentication above is based on the fact that music data recorded to an MD by an individual user operating his MD device in the household has sound frames arranged quite differently in terms of recorded locations from those of the same music data recorded onto an MD through the music server system 30. The discrepancy in sound frame arrangements between the two modes of recording is utilized as a basis for determining easily and reliably whether the music data found on any external storage medium loaded in the music server system 30 are those offered legally by the legitimate music data vendor running the music server system 30. Once the source of the music data is judged to be legitimate, the user may be offered a new service by the music server system.

In the examples above, the user's external storage medium was described as brought up and loaded into the predetermined music server system 30. However, this is not limitative of the invention; it is not imperative for the user's external storage medium to be load into the very music server system that previously recorded the music data to the medium in question.

Instead, music data may be recorded to the external storage medium through any one of the music server systems 30(1), 30(2), . . . , 30(N) connected to the main server 10 as shown in FIG. 8. Any external storage medium having music data recorded thereon in that fashion is entitled to receive the same service through any one of the music server systems 30(1), 30(2), . . . , 30(N).

In each of the examples in FIGS. 10 through 14, the music server system 30 extracts a specific sound frame from the music data held on the user's external storage medium loaded into the system, transmits the extracted sound frame as inquiry information to the main server 10, and receives a response to the inquiry from the main server 10 for authentication purposes.

FIG. 15 outlines steps constituting a typical authentication procedure performed by the main server 10.

In step S1501 of FIG. 15, the music server system 30 (terminal side) sends input music information to the main server 10. In step S1502, the main server 10 searches its database for the applicable music data based on the received music information. In step S1503, the main server 10 transmits to the music server system 30 availability information about the music data of interest.

If the music server system 30 receives information indicative of the music data being unavailable, then the system 30 gives an "applicable music data not found" display in step S1504. If the music server system 30 receives information indicative of the music data being available, the system 30 reads a specific frame of the music data from the storage medium and sends the retrieved frame as inquiry information to the main server 10 in step S1505.

In step S1506, the main server 10 generates reference inquiry information based on a specific frame of the music data found earlier inside. In step S1507, the main server 10 compares the generated reference inquiry information with the inquiry information received from the music server system 30. In step S1508, the result of the comparison is sent from the main server 10 to the music server system 30.

If the comparison result received by the music server system 30 indicates a mismatch, then the system 30 gives a "mismatch" display in step S1509. If the comparison result indicates a match, then the music server system 30 settles charges as needed in step S1510. In step S1511, the main server 10 transmits additional service information to the music server system 30 as described above in FIGS. 11 through 14. In step S1512, the music data are moved from one storage medium to another within the music server system 30 in the manner depicted in FIG. 10.

Although the authentication procedure preparatory to the services shown in FIGS. 10 through 15 is performed by the main server 10, this is not limitative of the invention. Alternatively, the music server system 30 may receive predetermined sound frame data (of 212 bytes) regarding the music data of interest from the main server 10 for comparison with the corresponding sound frame data within the system 20 for authentication purposes.

FIG. 16 depicts steps of authentication carried out by the music server system 30. In FIG. 16, steps S1601 through S1604 are identical to steps S1501 through S1504 in FIG. 15 and thus will not be described further.

If the applicable music data are found in step S1602, then step S1605 is reached in which the main server 10 generates reference inquiry information based on the predetermined frame of the applicable music data. In step S1606, the main server 10 transmits the generated reference inquiry information to the music server system 30.

In step S1607, the music server system 30 compares the inquiry information it generated with the reference inquiry information received from the main server 10. In step S1608, the result of the comparison is sent from the music server system 30 to the main server 10.

If the comparison result obtained by the music server system 30 indicates a mismatch, then the system 30 gives a "mismatch" display in step S1609. If the comparison result indicates a match, then the music server system 30 settles charges as needed in step S1610. In step S1611, the main server 10 transmits additional service information to the music server system 30 as described above in FIGS. 11 through 14. In step S1612, the music data are moved from one storage medium to another within the music server system 30 in the manner depicted in FIG. 10.

As a further variation of the invention, the music server system 30 may have its own storage arrangement or database that accommodates significant quantities of music data under proper management. In that setup, a suitable sound frame of music data from outside may be compared with the corresponding sound frame of the applicable music data within the system 30 for authentication.

In addition to the services described above, such tasks as analyzing users' faulty storage medium following their complaints about apparently defective music data they purchased using the media can also utilize the procedure discussed above with reference to FIG. 9, before the analysis. Specifically, a check is made in advance to see whether the music data have been purchased legally from the music data vendor. If the source of the music data is established as a legitimate one, then the music data may be offered again illustratively free of charge to the user who lodged complaints.

Whereas the examples above were described as setups in which digital audio data are encoded by the low bit rate coding method, these are not limitative of the invention. The invention also applies to other setups where low bit rate-encoded digital data such as still picture data and moving picture data are recorded to storage media that are then offered to end users.

Although the low bit rate coding method described above was ATRAC (Adaptive Transform Acoustic Coding), this is not limitative of the invention. Many other methods may also be adopted including those based on such standards as MPEG (Moving Picture Experts Group), MP3 (MPEG Audio Layer 3), AAC (Advanced Audio Coding), WMA (Windows Media Audio), ATRAC3 (Adaptive Transform Acoustic Coding 3, an extended ATRAC), and Twin-VQ (Transform-Domain Weighted Interleave Vector Quantization).

In the examples above, certain sound frame data (of 212 bytes) making up part of the music data of interest were shown utilized as inquiry information. That is, the inquiry information was described as constituting an integral part of the digital data to be processed.

Alternatively, the inquiry information may be anything that is embedded in the digital data and takes a specific data pattern identifying a legitimate data vendor. In that sense, the inquiry information can be digital watermarking or other suitable information multiplexed in the target digital data.

As described, where the user's external storage medium has no area in which to record information identifying a legitimate source (i.e., data vendor) of recorded digital data such as music data, the embodiment of the invention checks simply and reliably to see whether the digital data held on the medium have been legally purchased from the legitimate data vendor. Such authentication makes it possible for digital data delivery businesses to offer customers diverse services that were conventionally unavailable. Variations of the invention may be expanded to cover maintenance, warranty and other related services for previously delivered digital data. The invention is thus conducive to building a data delivery system allowing customers to receive desired digital data in a highly reliable manner.

As many apparently different embodiments of this invention may be made without departing from the spirit and scope thereof, it is to be understood that the invention is not limited to the specific embodiments thereof except as defined in the appended claims.

What is claimed is:

1. A system, comprising:
an information center server; and
a particular digital signal processing apparatus in communication with information center server over a communication line, the digital signal processing apparatus including:
extracting means for extracting a particular sound frame of music data from encoded digital data recorded on an external storage medium that has been loaded into said digital signal processing apparatus,
transmitting means for transmitting inquiry information to the information center server over the communication line, the inquiry information including the extracted particular sound frame of music data; said information center server including:
receiving means for receiving the inquiry information transmitted from said digital signal processing apparatus,
retrieving means for retrieving digital data subject to the inquiry from the received inquiry information, the retrieved digital data subject to the inquiry including the extracted particular sound frame of music data,
reference inquiry generating means for generating reference inquiry information including a reference sound frame of music data stored in the information center server that corresponds to the extracted particular sound frame of music data and having a timing of a start of encoding or recording that is consistent with that particular digital signal processing apparatus,
comparing means for comparing the extracted particular sound frame of music data included in the inquiry information and the reference sound frame of music data, the extracted particular sound frame of music data included in the inquiry information matching the reference sound frame of music data being an indication that the encoded digital data recorded on the storage medium has the timing of the start of encoding or recording that is consistent with that particular digital signal processing apparatus and thereby is legally purchased data, the extracted particular sound frame of music data included in the inquiry information not matching the reference sound frame of music data being an indication that the encoded digital data recorded on the storage medium has a timing of a start of encoding or recording that is not consistent with that particular digital signal processing apparatus,
inquiry result generating means for generating a result of the inquiry based on a result of the comparison carried out by said comparing means, and
transmitting means for transmitting the result of the inquiry to the digital signal processing apparatus over the communication line;
the digital signal processing apparatus including:
receiving means for receiving, from the information center server over the communication line, the result of the inquiry,
discriminating means for judging, based on the received result of the inquiry, whether the encoded digital data recorded on the storage medium is legally purchased data, and
controlling means for executing, in response to said discriminating means judging the encoded digital data to be legally purchased data, a process to offer an additional service to the customer,
the additional service offered to the customer by said controlling means including:
moving the encoded digital data from said storage medium to another storage medium,
restoring the encoded digital data onto said storage medium in response to the encoded digital data having been partially destroyed, and
converting the encoded digital data recorded on said storage medium into encoded digital data of a different bit rate before replacing unconverted digital data with converted digital data on said storage medium.

2. The system according to claim 1, wherein said additional service is offered to said customer by said controlling means converting said encoded digital data recorded on said storage medium with an algorithm of a predetermined version into digital data having undergone encoding with an algorithm of a more advanced version, before replacing unconverted digital data with converted digital data on said storage medium.

3. The system according to claim 1, wherein said additional service offered to said customer comprises furnishing said customer, free of charge, with a product related to a producing party who produces said digital data purchased legally by said customer from said information center server.

4. The system according to claim 1, further comprising inputting means for inputting identification information for identifying said encoded digital data that are subject to said inquiry, wherein said identification information input through said inputting means is transmitted to said information center server over said communication line.

5. The system according to claim 4, wherein said receiving means receives said inquiry information and said identification information transmitted from said digital signal processing apparatus.

6. The system according to claim 1, further comprising charging means for processing charges; wherein in response to said discriminating means judging that said encoded digital data recorded on said storage medium are legally purchased data, said charging means charges one of nothing and a reduced amount on to said customer for said additional service offered to said customer.

7. A digital signal processing method, comprising:
loading an external storage medium into a particular digital signal processing apparatus;
extracting, at the digital signal processing apparatus, a particular sound frame of music data from the encoded digital data recorded on the loaded external storage medium;
transmitting identification information and inquiry information from the digital signal processing apparatus to an information center server over a communication line, the identification information identifying encoded digital data recorded on the loaded storage medium, the inquiry information including the extracted particular sound frame of music data;
receiving, at the information center server, the inquiry information transmitted from said digital signal processing apparatus;
retrieving, at the information center server, digital data subject to the inquiry from the received inquiry information, the retrieved digital data subject to the inquiry including the extracted particular sound frame of music data;
generating, at the information center server, reference inquiry information including a reference sound frame of music data stored in the information center server that corresponds to the extracted particular sound frame of music data and which is encoded or recorded in a manner consistent with that particular digital signal processing apparatus;
comparing, at the information center, the extracted particular sound frame of music data included in the inquiry information and the reference sound frame of music data, the extracted particular sound frame of music data included in the inquiry information matching the reference sound frame of music data being an indication that the encoded digital data recorded on the storage medium has the timing of the start of encoding or recording that is consistent with that particular digital signal processing apparatus and thereby is legally purchased data, the extracted particular sound frame of music data included in the inquiry information not matching the reference sound frame of music data being an indication that the encoded digital data recorded on the storage medium has a timing of a start of encoding or recording that is not consistent with that particular digital signal processing apparatus;
generating, at the information center, a result of the inquiry based on a result of the comparison carried out by said comparing means;
transmitting the result of the inquiry from the information center server to the digital signal processing apparatus over the communication line;
receiving, at the digital signal processing apparatus from the information center server, the result of the inquiry;
judging, at the digital signal processing apparatus, based on the received result of the inquiry, whether the encoded digital data recorded on said storage medium is legally purchased data; and
executing, at the digital signal processing apparatus, in response to the encoded digital data being judged to be legally purchased data, a process of offering an additional service to the customer,
the additional service offered to the customer including:
moving the encoded digital data from said storage medium to another storage medium,
restoring the encoded digital data onto said storage medium in response to the encoded digital data having been partially destroyed, and
converting the encoded digital data recorded on said storage medium into encoded digital data of a different bit rate before replacing unconverted digital data with converted digital data on said storage medium.

8. The digital signal processing method according to claim 7, wherein said additional service offered to said customer comprises converting said encoded digital data recorded on said storage medium into encoded digital data encoded with an algorithm of a predetermined version, before replacing unconverted digital data with converted digital data on said storage medium.

9. The digital signal processing method according to claim 7, wherein said additional service offered to said customer comprises furnishing said customer, free of charge, with a product related to a producing party who produced said digital data purchased legally by said customer from said information center server.

10. The digital signal processing method according to claim 7, further comprising: inputting, at the digital signal processing apparatus, the identification information for identifying the encoded digital data.

11. A system, comprising:
an information center server; and
a particular digital signal processing apparatus in communication with information center server over a communication line, the digital signal processing apparatus including:
extracting means for extracting a particular sound frame of music data from encoded digital data recorded on an external storage medium that has been loaded into said digital signal processing apparatus,
transmitting means for transmitting inquiry information to the information center server over the communication line, the inquiry information including the extracted particular sound frame of music data;
said information center server including:
receiving means for receiving the inquiry information transmitted from said digital signal processing apparatus,
retrieving means for retrieving digital data subject to the inquiry from the received inquiry information, the retrieved digital data subject to the inquiry including the extracted particular sound frame of music data,
reference inquiry generating means for generating reference inquiry information including a reference sound frame of music data stored in the information center server that corresponds to the extracted particular sound frame of music data and which is encoded or recorded in a manner consistent with that particular digital signal processing apparatus, and transmitting means for transmitting the reference inquiry information to the digital signal processing apparatus over the communication line;

the digital signal processing apparatus including:

receiving means for receiving, from the information center server over the communication line, the transmitted reference inquiry information, comparing means for comparing the extracted particular sound frame of music data and the reference sound frame of music data, the extracted particular sound frame of music data matching the reference sound frame of music data being an indication that the encoded digital data recorded on the storage medium has the timing of the start of encoding or recording that is consistent with that particular digital signal processing apparatus and thereby is legally purchased data, the extracted particular sound frame of music data not matching the reference sound frame of music data being an indication that the encoded digital data recorded on the storage medium has a timing of a start of encoding or recording that is not consistent with that particular digital signal processing apparatus, discriminating means for judging, based on the result of the comparison carried out by said comparing means, whether the encoded digital data recorded on the storage medium was legally purchased data, and controlling means for executing, in response to said discriminating means judging the encoded digital data to be legally purchased data, a process to offer an additional service to the customer, the additional service offered to the customer by said controlling means including:

moving the encoded digital data from said storage medium to another storage medium, restoring the encoded digital data onto said storage medium in response to the encoded digital data having been partially destroyed, and converting the encoded digital data recorded on said storage medium into encoded digital data of a different bit rate before replacing unconverted digital data with converted digital data on said storage medium.

12. The system according to claim 11, wherein said additional service is offered to said customer by said controlling means converting said encoded digital data recorded on said storage medium with an algorithm of a predetermined version into digital data having undergone encoding with an algorithm of a more advanced version, before replacing unconverted digital data with converted digital data on said storage medium.

13. The system according to claim 11, wherein said additional service offered to said customer comprises furnishing said customer, free of charge, with a product related to a producing party who produces said digital data purchased legally by said customer from said information center server.

14. The system according to claim 11, further comprising inputting means for inputting identification information for identifying said encoded digital data that are subject to said inquiry, wherein said identification information input through said inputting means is transmitted to said information center server over said communication line.

15. The system according to claim 11, further comprising charging means for processing charges; wherein in response to said discriminating means judging that said encoded digital data recorded on said storage medium are legally purchased data, said charging means charges one of nothing and a reduced amount on to said customer for said additional service offered to said customer.

* * * * *